US011168701B2

(12) United States Patent
Iwakiri et al.

(10) Patent No.: US 11,168,701 B2
(45) Date of Patent: Nov. 9, 2021

(54) CENTRIFUGAL COMPRESSOR AND TURBOCHARGER

(71) Applicant: MITSUBISHI HEAVY INDUSTRIES ENGINE & TURBOCHARGER, LTD., Sagamihara (JP)

(72) Inventors: Kenichiro Iwakiri, Tokyo (JP); Yoshihiro Hayashi, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 16/467,270

(22) PCT Filed: Jan. 30, 2018

(86) PCT No.: PCT/JP2018/002892
§ 371 (c)(1),
(2) Date: Jun. 6, 2019

(87) PCT Pub. No.: WO2018/147128
PCT Pub. Date: Aug. 16, 2018

(65) Prior Publication Data
US 2020/0063751 A1   Feb. 27, 2020

(30) Foreign Application Priority Data

Feb. 8, 2017  (WO) ................. PCT/JP2017/004611

(51) Int. Cl.
*F04D 29/44* (2006.01)
*F04D 29/30* (2006.01)
(Continued)

(52) U.S. Cl.
CPC ............. *F04D 29/30* (2013.01); *F04D 17/10* (2013.01); *F04D 29/284* (2013.01);
(Continued)

(58) Field of Classification Search
CPC .... F04D 17/10; F04D 29/4206; F04D 29/284; F04D 29/30
See application file for complete search history.

(56) References Cited

U.S. PATENT DOCUMENTS 5,246,335 A * 9/1993 Mitsubori ........... F04D 29/4213
415/214.1
8,550,775 B2 * 10/2013 Chen .................... F04D 29/162
415/173.1
(Continued)

FOREIGN PATENT DOCUMENTS

CN    105358837 A    2/2016
JP    H08-074791 A   3/1996
(Continued)

OTHER PUBLICATIONS

International Preliminary Report on Patentability and the Written Opinion of the International Searching Authority for International Application No. PCT/JP2017/004611, dated Aug. 22, 2019, with English translation.
(Continued)

*Primary Examiner* — Michael L Sehn
(74) *Attorney, Agent, or Firm* — Birch, Stewart, Kolasch & Birch, LLP

(57) ABSTRACT

A centrifugal compressor includes an impeller including a hub and a plurality of blades disposed on an outer peripheral surface of the hub at intervals in a circumferential direction, and a casing accommodating the impeller and defining an inlet passage for introducing air along an axial direction of the impeller. An inner peripheral surface of the inlet passage includes a narrowed portion, and an inclined portion connected to a downstream side of the narrowed portion and having a radial distance from a rotational axis of the impeller gradually increasing toward the vicinity of tips of leading edges of the blades. Further, $0.01R1 \leq \sigma \leq 0.1R1$ is satisfied,
(Continued)

where R1 is radial distance between a downstream end of the inclined portion and the rotational axis, R2 is radial distance between a downstream end of the narrowed portion and the rotational axis, and σ is constriction amount which is a difference between R1 and R2.

16 Claims, 14 Drawing Sheets

(51) Int. Cl.
  *F04D 17/10*  (2006.01)
  *F04D 29/28*  (2006.01)
  *F04D 29/42*  (2006.01)
(52) U.S. Cl.
  CPC ........ *F04D 29/4206* (2013.01); *F04D 29/444* (2013.01); *F05D 2220/40* (2013.01); *F05D 2250/51* (2013.01)

(56) References Cited

U.S. PATENT DOCUMENTS

| | | | |
|---|---|---|---|
| 2014/0105736 A1* | 4/2014 | Kiriaki | F04D 29/665 415/182.1 |
| 2015/0354591 A1 | 12/2015 | Ibaraki et al. | |
| 2016/0131145 A1* | 5/2016 | Mohtar | F02C 6/12 417/380 |
| 2016/0201693 A1 | 7/2016 | An et al. | |
| 2016/0258447 A1* | 9/2016 | Day | F02C 7/045 |

FOREIGN PATENT DOCUMENTS

| | | |
|---|---|---|
| JP | 2008-202415 A | 9/2008 |
| JP | 2008-208753 A | 9/2008 |
| JP | 2009-257177 A | 11/2009 |
| JP | 2012-177311 A | 9/2012 |
| JP | 2015-163776 A | 9/2015 |
| JP | 5824821 B2 | 12/2015 |
| WO | WO 2014/128931 A1 | 8/2014 |
| WO | WO 2015/001644 A1 | 1/2015 |
| WO | WO 2015/128724 A1 | 9/2015 |

OTHER PUBLICATIONS

International Preliminary Report on Patentability and the Written Opinion of the International Searching Authority for International Application No. PCT/JP2018/002892, dated Aug. 22, 2019, with English translation.
International Search Report for International Application No. PCT/JP2017/004611 dated Mar. 28, 2017.
International Search Report for International Application No. PCT/JP2018/002892 dated Feb. 27, 2018.
Office Action dated Apr. 28, 2020 issued in counterpart Japanese Application No. 2018-567377 with an English Translation.
Japanese Office Action, dated Jul. 14, 2020, for Japanese Application No. 2018-567377, with an English machine translation.
Chinese Office Action dated Apr. 13, 2020, issued in counterpart CN application No. 201880005448.9, with a Machine Translation.
Extended European Search Report dated May 12, 2020, issued in the corresponding EP application No. 18751966.5.
Japanese Reconsideration Report for counterpart Japanese Application No. 2021-004891, dated Jun. 4, 2021, with English translation.

* cited by examiner (a)

(b)

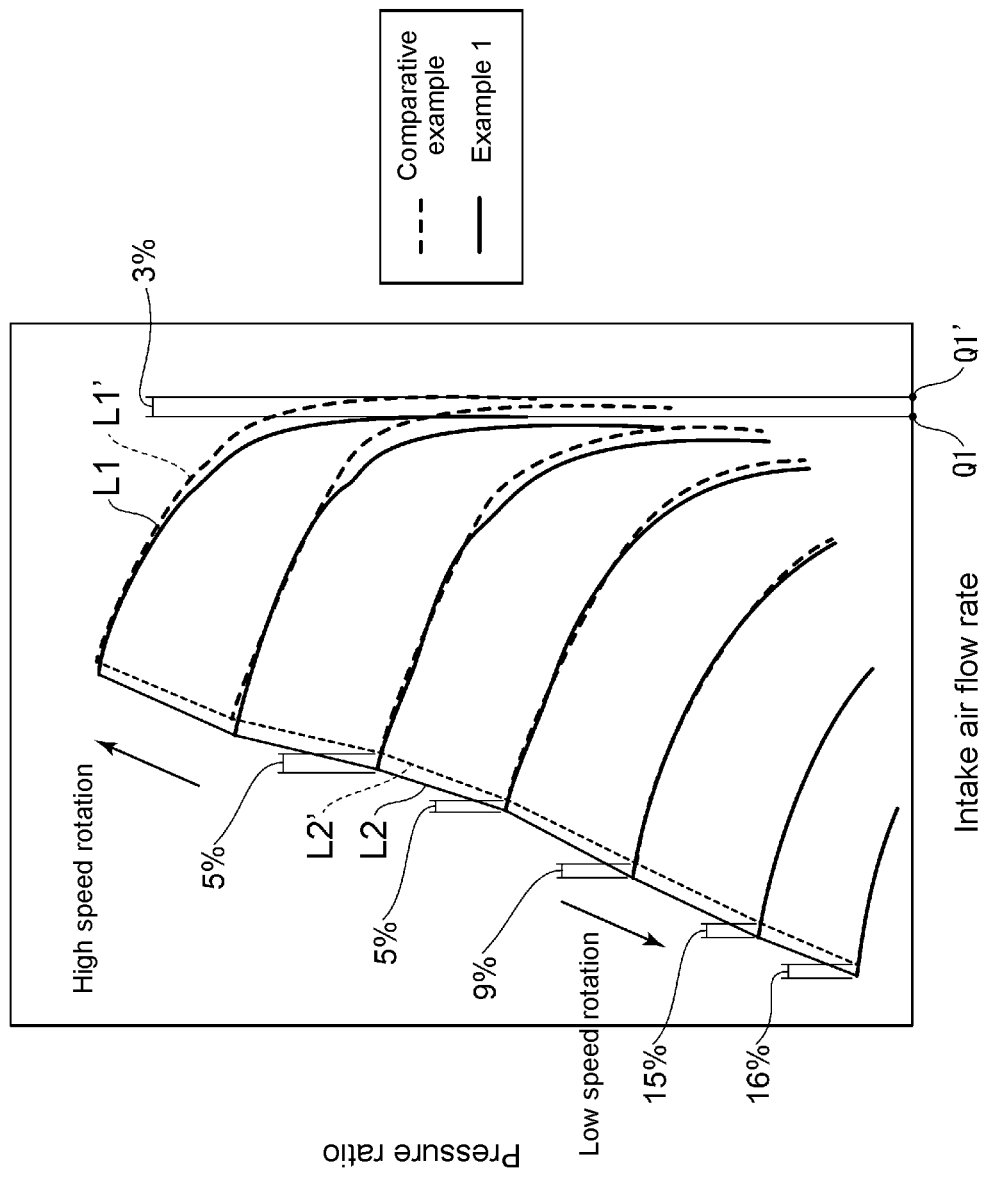

CENTRIFUGAL COMPRESSOR AND TURBOCHARGER

TECHNICAL FIELD

The present disclosure relates to a centrifugal compressor and a turbocharger including the same.

BACKGROUND ART

In recent years, downsizing of engines equipped with a turbocharger has become common in the field of automobile engines, as a technique to reduce fuel consumption. Further, in recent years, a method for evaluating fuel consumption of automobile pays attention to extremely low speed or acceleration which is near to actual operating conditions of an engine. Accordingly, a wide-range and high-efficiency turbocharger enabling operation in a low-flow-rate operating region close to the surge line is desired.

One solution to the wide range and high efficiency in a low-flow-rate operating region is to reduce the outer diameter of the impeller. In the low-flow-rate operating region, backflow (surging) occurs at the inlet of the impeller. The development of this backflow can be prevented by reducing the outer diameter of the impeller and the circumferential velocity and thereby increasing the absolute velocity at the inlet of the impeller (increasing dynamic pressure).

However, when the outer diameter of the impeller decreases, the throat area of the impeller section also decreases, resulting in a reduction in maximum flow rate (choked flow rate) which can pass through the impeller section. Another possible way is to reduce the diameter of the tip (boss portion) of the hub to ensure the choked flow rate. However, since the impeller is fastened to a rotational shaft by screwing the rotational shaft inserted in the boss portion with a nut, there is a limit to the reduction in diameter of the boss portion.

To solve the above problem, in Patent Document 1, narrowing is provided in an inlet passage, through which intake air flows to the impeller, to increase the intake air velocity at the inlet of the impeller, thereby attempting to improve the surge margin. Further, Patent Document indicates a reduction in choked flow rate as its reciprocal phenomenon. To solve this problem, Patent Document 1 provides a secondary passage bypassing the narrowed portion and an open/close valve installed in the secondary passage. In a low-flow-rate region, the open/close valve is fully closed, while in a high-flow-rate region the open/close valve is fully opened, thereby attempting to achieve both improvement of the surge margin and ensuring of the choked flow rate.

CITATION LIST

Patent Literature

Patent Document 1: JP5824821B

SUMMARY

Problems to be Solved

However, the structure in Patent Document 1 is complicated and thus is less feasible in terms of cost and space. In particular, compact turbochargers for automobiles have strong demand for low cost and space saving, and thus it is desired both to improve the surge margin and to ensure the choked flow rate with a simpler structure than such a complicated structure.

The present invention was made under the above-described background art, and an object thereof is to provide a centrifugal compressor whereby it is possible to both improve the surge margin and ensure the choked flow rate with a simple structure.

Solution to the Problems (1) A centrifugal compressor according to an embodiment of the present invention comprises: an impeller including a hub and a plurality of blades disposed on an outer peripheral surface of the hub at intervals in a circumferential direction; and a casing accommodating the impeller and defining an inlet passage for introducing air to the impeller along an axial direction of the impeller therein. An inner peripheral surface of the inlet passage includes a narrowed portion and an inclined portion connected to a downstream side of the narrowed portion, with a distance between the inclined portion and a rotational axis of the impeller in a radial direction gradually increasing toward a vicinity of tips of leading edges of the blades, and $0.01R1 \leq \sigma \leq 0.1R1$ is satisfied, where R1 is a distance between a downstream end of the inclined portion and the rotational axis of the impeller in the radial direction, R2 is a distance between a downstream end of the narrowed portion and the rotational axis of the impeller in the radial direction, and $\sigma$ is a constriction amount which is a difference between R1 and R2.

In the centrifugal compressor according to the embodiment described in the above (1), the inner peripheral surface of the inlet passage has a narrowed portion and an inclined portion connected to a downstream side of the narrowed portion with the distance between the inclined portion and the rotational axis of the impeller gradually increasing toward the vicinity of the tips of the leading edge of the blades. With this configuration, air accelerated through the narrowed portion reaches the leading edges of the blades, without separation, along the inclined portion. Thus, it is possible to suppress the occurrence of backflow (surging) at the inlet of the impeller.

Further, the centrifugal compressor according to the embodiment described in the above (1) is configured to satisfy $0.01R1 \leq \sigma \leq 0.1R1$, where R1 is a distance between the downstream end of the inclined portion and the rotational axis of the impeller in the radial direction, R2 is a distance between the downstream end of the narrowed portion and the rotational axis of the impeller in the radial direction, and $\sigma$ is a constriction amount which is a difference between R1 and R2. As a result of intensive studies by the present inventors, they have found that it is possible to improve the surge margin without reducing the choked flow rate, even with a narrowed portion which is small enough to satisfy $0.01R1 \leq \sigma \leq 0.1R1$. When $\sigma < 0.01R1$, the constriction amount $\sigma$ is too small to improve the surge margin. On the other hand, when $\sigma > 0.1R1$, the constriction amount $\sigma$ is too large so that choke position (position defining maximum flow rate) is shifted from the throat portion of the impeller to the narrowed portion, increasing effect on the reduction in choked flow rate. In an example shown in FIG. 11A described later, the constriction amount $\sigma$ is $0.08R1$; and in an example shown in FIG. 11B, the constriction amount is in a range of $0.01R1 < \sigma < 0.08R1$.

The narrowed portion of the centrifugal compressor according to such an embodiment of the present invention is much narrower than the narrowed portion disclosed in Patent Document 1 described above. According to conventional findings, it has not been considered that a small narrowed portion that satisfies $0.01R1 \leq \sigma \leq 0.1R1$ has a sufficient effect of improving the surge margin. In fact, the constriction amount σ in Patent Document 1 (FIG. 1) is about 0.16R1. In Patent Document 1, on the basis of a technical idea of "suppressing development of a backflow phenomenon occurring at the impeller inlet" (paragraph 0020 in Patent Document 1), a sufficiently large narrowed portion is provided so that the backflow phenomenon does not develop to the narrowed portion (FIG. 3B of Patent Document 1).

However, as a result of intensive studies by the present inventor, they have found that, even with a narrowed portion that is small enough to satisfy $0.01R1 \leq \sigma \leq 0.1R1$, it is possible to achieve a sufficient effect of improving the surge margin by providing a gradually inclined portion downstream thereof so that intake air flows without separation, as described later in detail with reference to examples. Even in a case where a large narrowed portion is provided as in Patent Document 1, the effect of improving the surge margin decreases by separation of intake air downstream of the narrowed portion. That is, the present inventors have found that separation at the narrowed portion greatly affects the effect of improving the surge margin. An embodiment of the present invention has been completed based on such new finding of the present inventors.

(2) In some embodiments, in the centrifugal compressor described in the above (1), $Ac \geq At \times Nw$ is satisfied, where Ac is a flow passage area at the narrowed portion, At is a throat area of an inter-blade passage defined by a pair of adjacent blades of the plurality of blades, and Nw is the number of the plurality of blades.

As described above, according to intensive studies by the present inventors, when $\sigma \geq 0.1R1$, the constriction amount σ is too large so that choke position (position defining maximum flow rate) is shifted from the throat portion of the impeller to the narrowed portion, thus increasing effect on the reduction in choked flow rate. This means that, when $\sigma = 0.1R1$, the flow passage area Ac corresponds to $Ac = At \times Nw$.

In this regard, the centrifugal compressor according to the embodiment described in the above (2) is configured to satisfy $Ac \geq At \times Nw$, where Ac is a flow passage area at the narrowed portion, At is a throat area of the inter-blade passage defined by a pair of adjacent blades of the plurality of blades, and Nw is the number of the plurality of blades. That is, the flow passage area Ac of the narrowed portion is equal to or larger than the sum of the throat areas of the inter-blade passages (hereinafter, also simply referred to as throat are Ath of impeller section). Thus, it is possible to improve the surge margin without reducing the choked flow rate by the narrowed portion.

(3) In some embodiments, in the centrifugal compressor described in the above (1) or (2), when R1 is the distance between the downstream end of the inclined portion and the rotational axis of the impeller in the radial direction, the downstream end of the inclined portion is at the same position as the tips of the leading edges of the blades in the axial direction of the impeller, or the downstream end of the inclined portion is located within 0.5R1 upstream from the tips of the leading edges of the blades.

The effect of improving the surge margin is obtained by increasing the intake air velocity by the narrowed portion, and the narrowed portion and the inclined portion are preferably formed as close as possible to the tip of the leading edge of the blade. Thus, according to the embodiment described in the above (3), it is possible to efficiently suppress the occurrence of backflow at the inlet of the impeller.

(4) In some embodiments, in the centrifugal compressor described in any one of the above (1) to (3), a minor angle between the rotational axis of the impeller and a straight line passing through an upstream end and the downstream end of the inclined portion is 6° or less.

After passing through the narrowed portion, air accelerated by the narrowed portion flows along the inclined portion. If the inclination angle of the inclined portion is too large, separation may occur. According to findings of the present inventors, if the inclination angle of the inclined portion is 6° or less, air having passed through the narrowed portion flows along the inclined portion without separation. Thus, according to the embodiment described in the above (4), it is possible to efficiently suppress the occurrence of backflow at the inlet of the impeller.

(5) In some embodiments, in the centrifugal compressor described in any one of the above (1) to (4), when R1 is the distance between the downstream end of the inclined portion and the rotational axis of the impeller in the radial direction, the narrowed portion has a length of 0.5R1 or more in the axial direction of the impeller.

If the length of the narrowed portion in the axial direction is too short, the flow of air passing through the narrowed portion does not follow the shape of the narrowed portion, and separation may occur. If separation occurs at the narrowed portion, the maximum flow rate which can pass through the narrowed portion decreases, which may cause a reduction in choked flow rate. Further, the effect of suppressing the backflow downstream of the narrowed portion may be weakened. Thus, according to the embodiment described in the above (5), it is possible to efficiently improve the surge margin by the narrowed portion without reducing the choked flow rate.

(6) In some embodiments, in the centrifugal compressor described in any one of the above (1) to (5), the inclined portion is linearly shaped in a cross-sectional view along the rotational axis of the impeller.

According to the embodiment described in the above (6), compared with a case where the inclined portion is curved as in an embodiment described in (7) later, it is possible to suppress the occurrence of backflow at the inlet of the impeller with a simple structure.

(7) In some embodiments, in the centrifugal compressor described in any one of the above (1) to (5), the inclined portion is curved convexly in a cross-sectional view along the rotational axis of the impeller.

According to the embodiment described in the above (7), compared with a case where the inclined portion is shaped linearly as in the embodiment described in the above (6), it is possible to smoothly connect the narrowed portion and the inclined portion. Thus, it is possible to suppress the separation of the flow of intake air at a joint between the narrowed portion and the inclined portion. Thus, it is possible to efficiently improve the surge margin without reducing the choked flow rate at a joint between the narrowed portion and the inclined portion.

(8) In some embodiments, in the centrifugal compressor described in the above (7), an inner peripheral surface of the casing includes a shroud portion connected to the downstream end of the inclined portion and disposed with a clearance from a tip of each of the blades, and the inclined portion and the shroud portion are connected to form a smooth curve in a cross-sectional view along the rotational axis of the impeller.

According to the embodiment described in the above (8), since the inclined portion and the shroud portion are smoothly connected, it is possible to reduce the loss caused by separation of the flow of intake air at a joint between the inclined portion and the shroud portion.

(9) In some embodiments, in the centrifugal compressor described in any one of the above (1) to (8), an inner peripheral surface of the casing includes a shroud portion connected to the downstream end of the inclined portion and disposed with a clearance from a tip of each of the blades, and the casing has a recirculation passage connecting an inlet opening formed in the shroud portion and an outlet opening formed upstream of the downstream end of the inclined portion in the inner peripheral surface of the inlet passage.

It is known that the recirculation passage for returning a part of intake air in the impeller to the upstream side of the impeller has effect of improving the surge margin. By directing the air flowing out of the outlet opening of the recirculation passage to the tip of the blade where backflow occurs, as parallel as possible to a flow direction of air flowing through the inlet passage, it is possible to improve the surge margin more efficiently. However, a conventional centrifugal compressor, in which the inner peripheral surface of the casing is formed horizontally, is difficult to have such a flow passage shape. In a conventional centrifugal compressor, the air flowing out of the outlet opening must flow in a direction largely intersecting with the flow of air flowing through the inlet passage, which causes loss. Thus, the embodiment described in the above (9) allows the air flowing out of the outlet opening to flow in a direction close to parallel to the flow of air flowing through the inlet passage, which makes it possible to improve the surge margin effectively while suppressing the occurrence of loss.

(10) In some embodiments, in the centrifugal compressor described in any one of the above (1) to (9), an annular guide vane is disposed in the inlet passage at a position upstream of the leading edges of the blades, and $D1>D2$ is satisfied, where $D1$ is a distance between an upstream end of the guide vane and the inner peripheral surface of the inlet passage in the radial direction, and $D2$ is a distance between a downstream end of the guide vane and the inner peripheral surface of the inlet passage in the radial direction.

According to the embodiment described in the above (10), the air flowing between the outer peripheral surface of the guide vane and the inner peripheral surface of the inlet passage is directed to the tip of the blade where backflow occurs, and thereby the air flowing adjacent to the tip of the blade is accelerated. This suppresses backflow at the tip of the blade, and thereby it is possible to improve the surge margin more efficiently.

(11) In some embodiments, in the embodiment described in the above (10), an inner peripheral surface of the guide vane is curved convexly from the upstream end to the downstream end of the guide vane in a cross-sectional view along the rotational axis of the impeller.

According to the embodiment described in the above (11), among the air flowing on the inner side of the annular guide vane, the air flowing along the inner peripheral surface of the guide vane is directed to the tip of the blade where backflow occurs, and thereby the air flowing adjacent to the tip of the blade is accelerated. Thereby, it is possible to further suppress backflow at the tip of the blade in combination with the effect according to the embodiment described in the above (10). Thereby, it is possible to more efficiently improve the surge margin.

(12) In some embodiments, in the centrifugal compressor described in any one of the above (1) to (11), the casing includes: a scroll-side casing section defining therein a diffuser passage through which air compressed by the impeller flows, and a scroll passage which is formed on a radially outer side of the diffuser passage and into which the air having passed through the diffuser passage flows; and an inlet-side casing section formed separately from the scroll-side casing section and defining therein the inlet passage, and the scroll-side casing section and the inlet-side casing section are connected along the axial direction of the impeller.

According to the embodiment described in the above (12), it is possible to form the casing by connecting the scroll-side casing section with the inlet-side casing section which is separate from the scroll-side casing section. Therefore, it is possible to provide the centrifugal compressor including the casing with high versatility, for instance, by preparing a variety of inlet-side casing sections having different shapes of the narrowed portions and the inclined portions and exchanging the inlet-side casing section in accordance with the change of specification or the like.

(13) In some embodiments, in the centrifugal compressor described in the above (12), an inner peripheral surface of the inlet-side casing section includes a portion from an upstream end of the narrowed portion to the downstream end of the inclined portion.

According to the embodiment described in the above (13), since the narrowed portion and the inclined portion are formed only on the inner peripheral surface of the inlet-side casing section, it is possible to provide the centrifugal compressor including the casing with high versatility.

(14) In some embodiments, in the centrifugal compressor described in the above (2), $Ac \geq 1.03 At \times Nw$ is satisfied.

According to findings of the present inventors, they have found that even if the flow passage area $Ac$ at the narrowed portion is equal to the throat area $Ath$ ($=At \times Nw$) of the impeller section ($Ac=Ath$), the choked flow rate is defined by the throat area of the impeller section. The reason is considered that, in the air flowing downstream of the narrowed portion, a boundary layer develops at the interface with the inner peripheral surface, which decreases the effective flow passage area at the inlet of the impeller section.

A possible solution to compensate the decrease in surge flow rate is to increase the outer diameter of the impeller and increase the throat area $Ath$ of the impeller section. However, if the outer diameter of the impeller is increased, the circumferential velocity increases and the absolute velocity decreases at the inlet of the impeller. As a result, surging is likely to occur. Further, increasing the outer diameter of the impeller increases the cost.

In view of this, the present inventors have considered increasing the flow passage area $Ac$ at the narrowed portion to be slightly larger than the throat area $Ath$ of the impeller section to compensate the decrease in surge flow rate, instead of increasing the outer diameter of the impeller. More specifically, as a result of intensive studies, they have arrived at a relationship of $Ac \geq 1.03 Ath$ ($=At \times Nw$). According to the intensive studies of the present inventors, by increasing the flow passage area $Ac$ at the narrowed portion 3% larger than the throat area $Ath$ of the impeller section, it is possible to increase the flow rate of air flowing into the inlet of the impeller section, and it is possible to suppress development of the boundary layer described above. Thereby, it is possible to compensate the decrease in choked flow rate $Qth$ due to the throat area $Ath$ of the impeller section.

(15) In some embodiments, in the centrifugal compressor described in the above (7) or (8), the inclined portion protrudes inward in the radial direction with respect to a line connecting an upstream end and the downstream end of the inclined portion, from the upstream end to the downstream end of the inclined portion, in a cross-sectional view along the rotational axis of the impeller.

According to the embodiment described in the above (15), since the inclined portion has no portion recessed from the line connecting the upstream end and the downstream end, it is possible to suppress the separation of the flow of intake air along the inclined portion.

(16) A turbocharger according to an embodiment of the present invention comprises the centrifugal compressor described in any one of the above (1) to (15).

According to the embodiment described in the above (16), it is possible to provide a turbocharger whereby it is possible to both improve the surge margin and ensure the choked flow rate with a simple structure.

Advantageous Effects

According to at least one embodiment of the present invention, there is provided a centrifugal compressor whereby it is possible to both improve the surge margin and ensure the choked flow rate with a simple structure.

BRIEF DESCRIPTION OF DRAWINGS

FIG. 11A is a graph for describing an effect of a centrifugal compressor according to an embodiment of the present invention.

DETAILED DESCRIPTION

Figure 1:
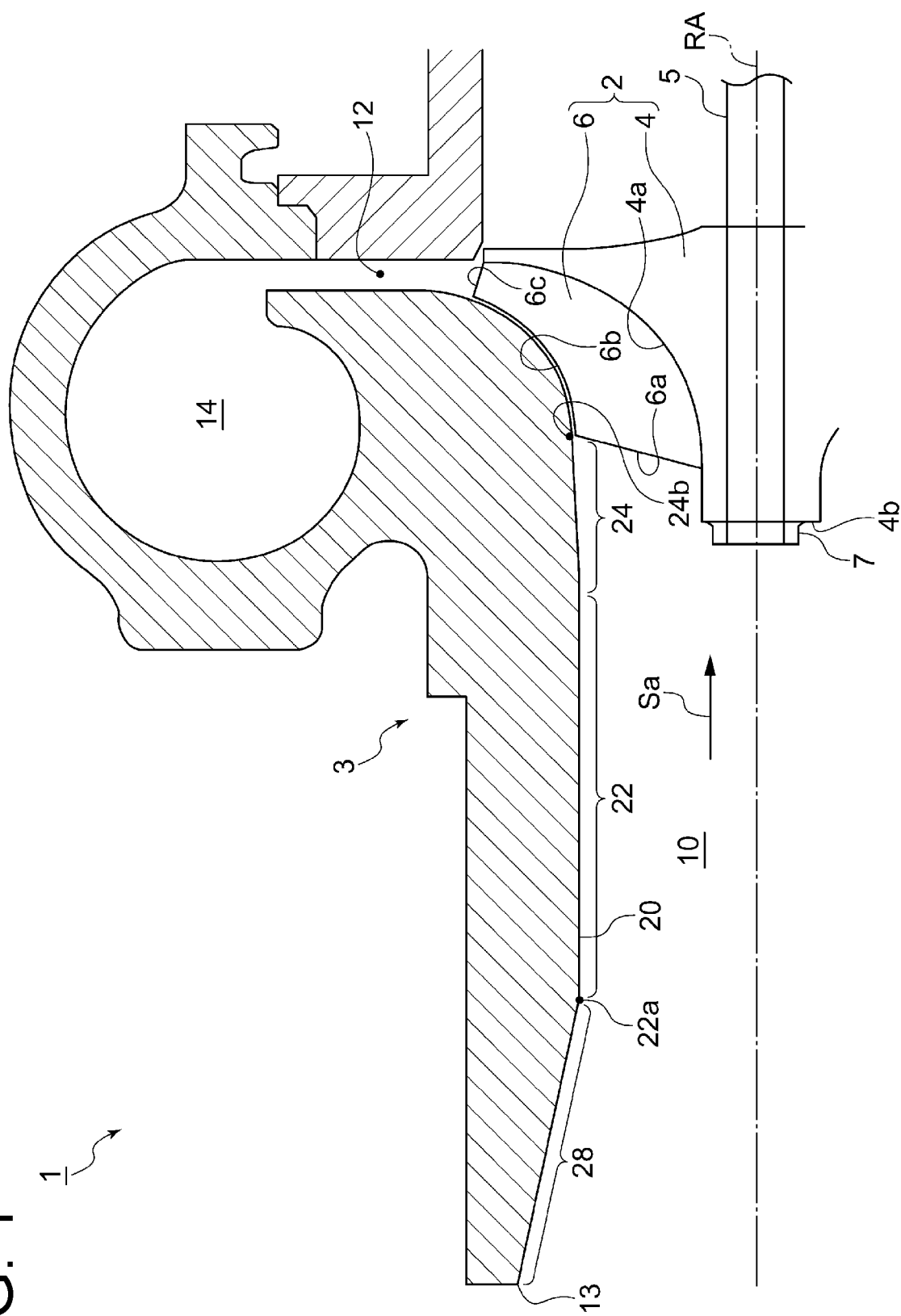
FIG. 1 is a cross-sectional view of a centrifugal compressor according to an embodiment of the present invention.
Figure 2:
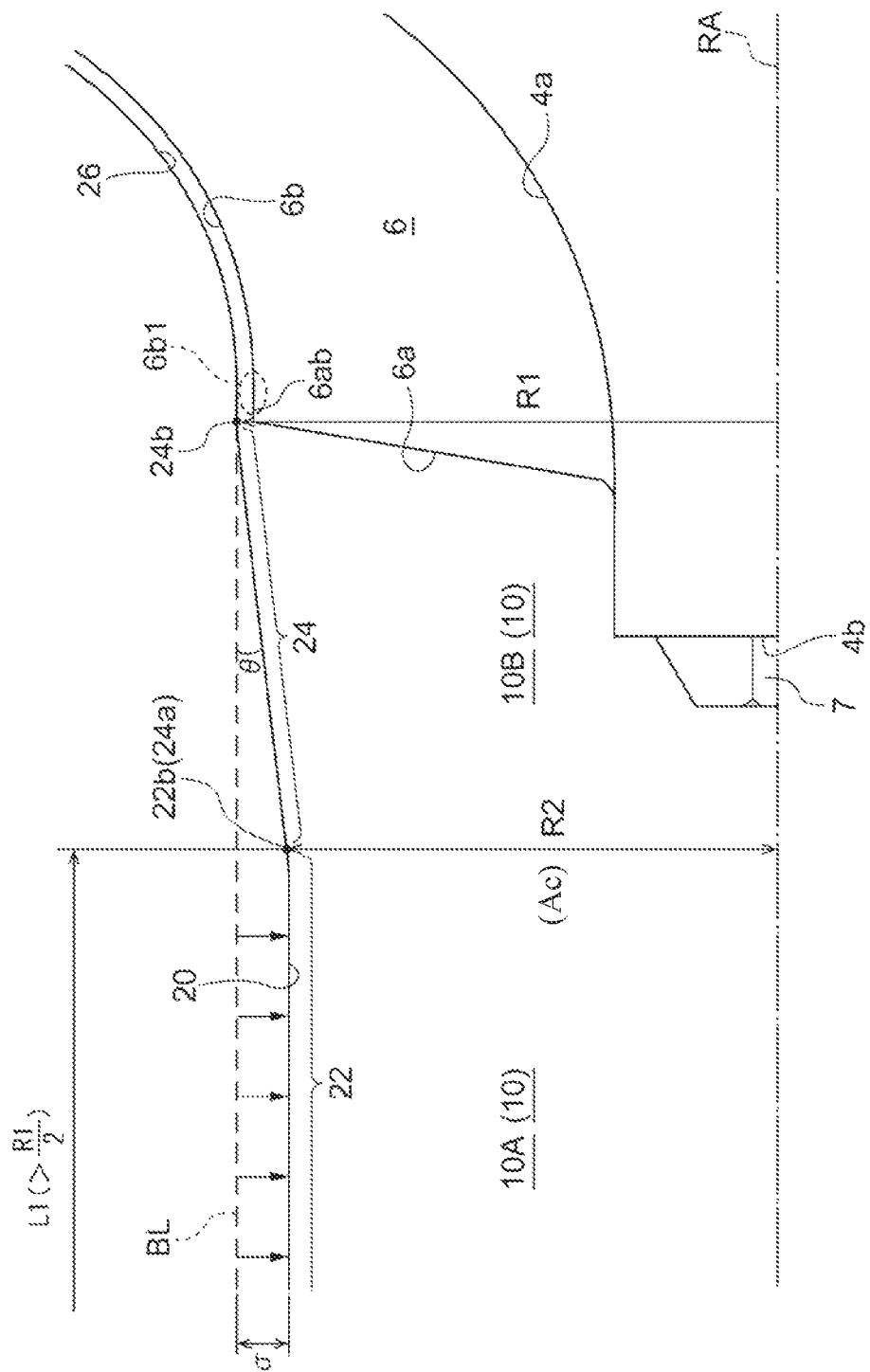
FIG. 2 is an enlarged view of a centrifugal compressor according to an embodiment of the present invention.

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Further, in the description below, some the same features are associated with the same reference numerals and not described again.

Figure 7:
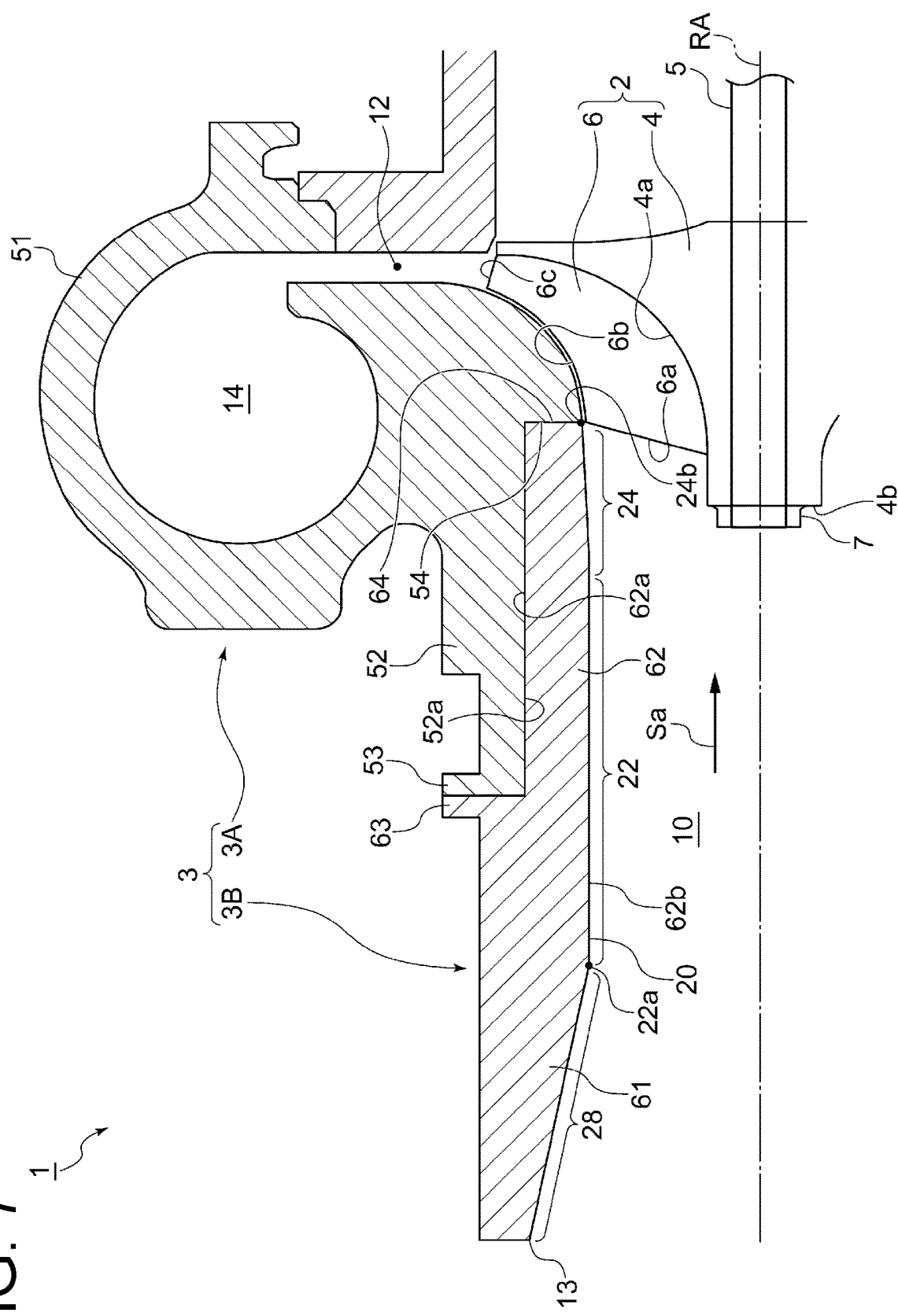
FIG. 7 is a cross-sectional view of a centrifugal compressor according to an embodiment of the present invention.

FIGS. 1 and 7 are cross-sectional views of a centrifugal compressor according to an embodiment of the present invention.

As shown in FIGS. 1 and 7, a centrifugal compressor 1 according to an embodiment of the present invention includes an impeller 2 and a casing 3. The impeller 2 includes a hub 4 and a plurality of blades 6 disposed on an outer peripheral surface 4a of the hub 4 at intervals in the circumferential direction. The casing 3 defines therein an inlet passage 10 for introducing air sa along the axial direction of the impeller 2 (direction parallel to rotational axis RA).

In the illustrated embodiments, the hub 4 has a substantially truncated cone shape, and the outer peripheral surface 4a thereof is formed in a curved shape that is concave from the top (upstream) toward the bottom (downstream). Further, a rotational shaft 5 is inserted in the hub 4, and one end of the rotational shaft 5 protruding from a tip end portion (boss portion) 4b is screwed with a nut 7, whereby the hub 4 is fixed to the rotational shaft 5.

Additionally, in the illustrated embodiments, the casing 3 has an inlet portion 13 opening to one side of the inlet passage 10. Additionally, in the illustrated embodiments, a flow passage cross-section gradually decreases from the inlet portion 13 to an upstream end 22a of a narrowed portion 22 described later. That is, an inner peripheral surface 20 of the inlet passage 20 includes a constriction portion 28 extending from the inlet portion 13 to the upstream end of the narrowed portion 22. Further, the casing 3 defines a diffuser passage 12 and a scroll passage 14 therein. The diffuser passage 12 is an annular flow passage positioned on a radially outer side of the impeller 2 and extends so as to have a longitudinal direction along the radial direction, in a cross-sectional view along the rotational axis RA of the impeller 2 (i.e., when viewed as shown in FIGS. 1 and 7). The scroll passage 14 is a flow passage of scroll shape positioned on a radially outer side of the diffuser passage 12.

Further, air sa introduced from the inlet portion 13 flows into the impeller 2 along the axial direction of the impeller 2. The air passing through an inter-blade passage 16, which is described later, and thereby compressed by the impeller 2 then flows through the diffuser passage 12 into the scroll passage 14.

FIGS. 2, 3, 4, 5, 6A, and 6B are enlarged views of a centrifugal compressor according to an embodiment of the present invention. In FIGS. 2, 3, 4, 5, 6A, and 6B, for the convenience of description, a narrowed portion 22 and an inclined portion 24 are shown enlarged in the radial direction more than in the axial direction, so that they are different from the actual aspect ratio. Further, in FIGS. 2, 3, 4, 5, 6A, and 6B, only one side (upper side) of the rotational axis RA is illustrated for the convenience of drawing, but the other side (lower side) of the rotational axis RA is configured similarly.

As shown in FIGS. 2, 3, 4, 5, 6A, and 6B, in the centrifugal compressor 1 according to an embodiment of the present invention, the inner peripheral surface 20 of the inlet passage 10 described above includes a narrowed portion 22 and an inclined portion 24 connected to a downstream side of the narrowed portion 22. The inclined portion 24 is configured so that a distance from the rotational axis RA of the impeller 2 in the radial direction gradually increases from a downstream end 22b of the narrowed portion 22 (an upstream end 24a of the inclined portion 24) toward the vicinity of a tip 6b (leading edge tip 6ab) of a leading edge 6a of the blade 6.

That is, the inlet passage 10 includes a narrowed passage 10A defined by the narrowed portion 22 and an enlarged passage 10B defined by the inclined portion.

In the illustrated embodiments, R2<R1 is satisfied, where R1 is a distance between the downstream end 24b of the inclined portion 24 and the rotational axis RA of the impeller 2 in the radial direction, and R2 is a distance between the downstream end 22b of the narrowed portion 22 (the upstream end 24a of the inclined portion 24) and the rotational axis RA of the impeller 2 in the radial direction. That is, the flow passage radius of the narrowed portion 22 is reduced from the flow passage radius at the downstream end 24b of the inclined portion 24 by constriction amount σ (=R1−R2). The reference line BL in the drawings is a line passing through the downstream end 24b of the inclined portion 24 and parallel to the rotational axis RA.

Additionally, in the illustrated embodiments, the inner peripheral surface of the casing 3 includes a shroud portion 26 connected to the downstream end 24b of the inclined portion 24 and disposed with a clearance from the tip 6b of the blade 6.

Additionally, in the illustrated embodiments, the leading edge 6a of the blade 6 is inclined downstream from the outer peripheral surface 4a of the hub 4 toward the leading edge tip 6ab. Additionally, in some embodiments, although not depicted, the leading edge 6a of the blade 6 may extend in a direction perpendicular to the rotational axis RA.

Figure 8:
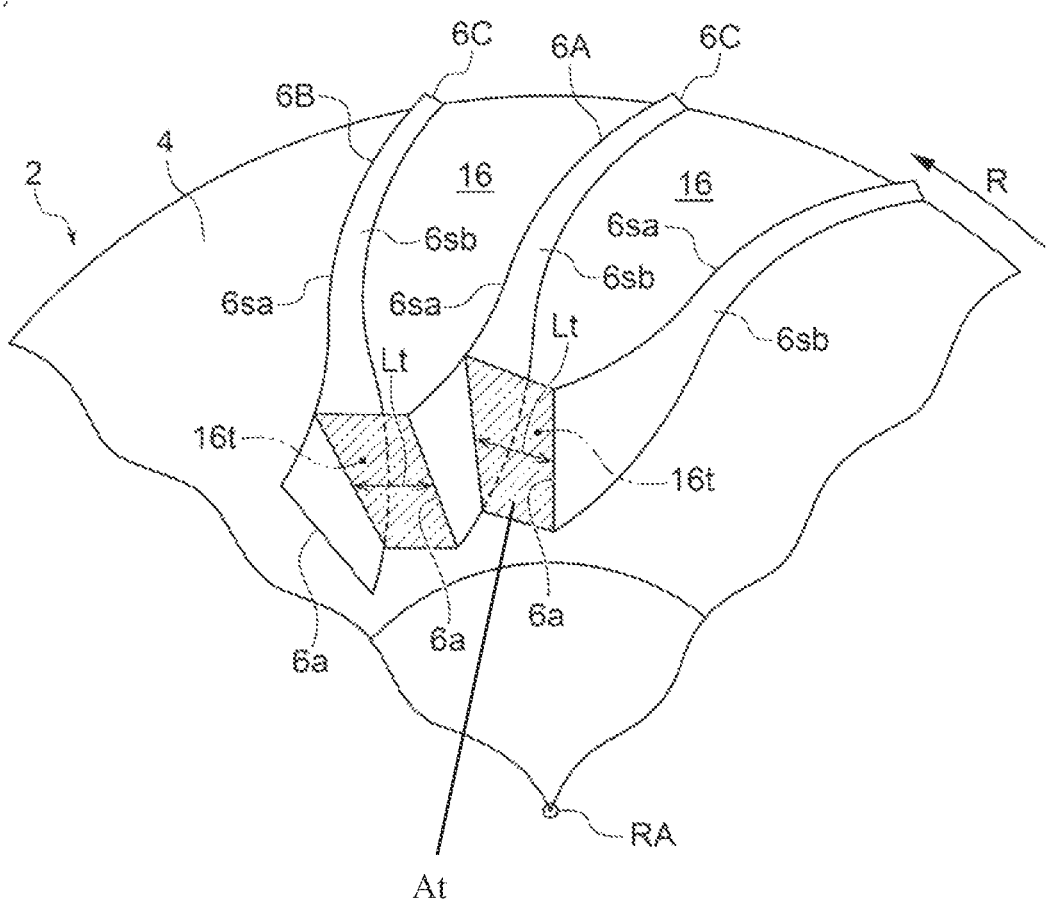
FIG. 8 is a diagram for describing a throat formed in an inter-blade passage according to an embodiment of the present invention.
Figure 8:
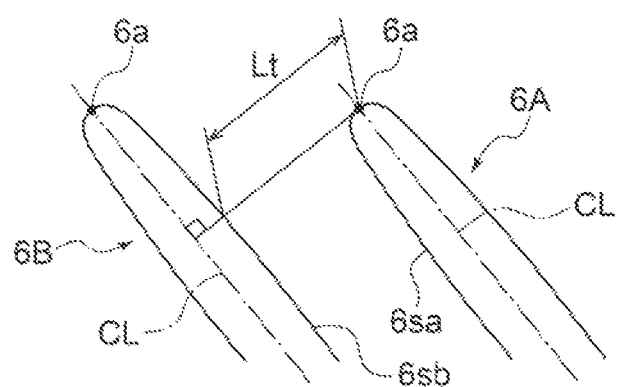

FIG. 8 is a diagram for describing a throat formed in an inter-blade passage according to an embodiment of the present invention.

As shown in part (a) of FIG. 8, an inter-blade passage 16 is formed between a pressure surface 6sa of one of two adjacent blades 6 and a suction surface 6sb of the other of the two adjacent blades 6. Further, the inter-blade passage 16 has a throat portion 16t at which the flow passage cross-section is minimum. The throat portion 16t is defined between the leading edge 6a of a first blade 6A of two adjacent blades and the suction surface 6sb of a second blade 6B of the two adjacent blades. More specifically, as shown in part (b) of FIG. 8, a perpendicular line is drawn from the leading edge 6a of the first blade 6A of the adjacent blades to a chord line CL (straight line connecting leading edge 6a and trailing edge 6c) of the second blade 6B of the adjacent blades. When a distance from the leading edge 6a of the first blade 6A to the suction surface 6sb of the second blade 6B along the perpendicular line is defined as throat length Lt, throat area At of the throat portion 16t is obtained by integrating with respect to the throat length Lt from the base (the outer peripheral surface 4a of the hub 4) to the tip 6b in the height direction of the blade 6.

Further, as shown in FIGS. 2, 3, 4, 5, 6A, and 6B, the centrifugal compressor 1 according to an embodiment of the present invention is configured to satisfy $0.01R1 \leq \sigma \leq 0.1R1$ where σ is a constriction amount which is the difference between R1 and R2.

As described above, in the centrifugal compressor 1 according to an embodiment of the present invention, the inner peripheral surface 20 of the inlet passage 10 has the narrowed portion 22 and the inclined portion 24 connected to the downstream side of the narrowed portion 22, with the distance between the inclined portion 24 and the rotational axis RA of the impeller 2 in the radial direction gradually increasing toward the vicinity of the tips 6b of the leading edges 6a of the blades 6. With this configuration, air accelerated through the narrowed portion 22 reaches the leading edges 6a of the blades 6, without separation, along the inclined portion 24. Thus, it is possible to suppress the occurrence of backflow (surging) at the inlet of the impeller 2.

Further, the centrifugal compressor 1 according to an embodiment of the present invention described above is configured to satisfy $0.01R1 \leq \sigma \leq 0.1R1$. As a result of intensive studies by the present inventors, they have found that it is possible to improve the surge margin without reducing the choked flow rate, even with the narrowed portion 22 which is small enough to satisfy $0.01R1 \leq \sigma \leq 0.1R1$. When $\sigma < 0.01R1$, the constriction amount σ is too small to improve the surge margin. On the other hand, when $\sigma > 0.1R1$, the constriction amount σ is too large so that choke position (position defining maximum flow rate) is shifted from the throat portion 16t of the impeller 2 to the narrowed portion 22, increasing effect on the reduction in choked flow rate. In an example shown in FIG. 11A describe later, the constriction amount σ is 0.08R1.

Further, the centrifugal compressor 1 according to an embodiment of the present invention may be configured to satisfy $0.05R1 \leq \sigma \leq 0.1R1$.

The narrowed portion 22 of such a centrifugal compressor 1 according to an embodiment of the present invention is much narrower than the narrowed portion disclosed in Patent Document 1 described above. According to conventional findings, it has not been considered that the narrowed portion 22 which is small enough to satisfies $0.01R1 \leq \sigma \leq 0.1R1$ has a sufficient effect of improving the surge margin. In fact, the constriction amount σ in Patent Document 1 (FIG. 1) is about 0.16R1. In Patent Document 1, on the basis of a technical idea of "suppressing development of a backflow phenomenon occurring at the impeller inlet" (paragraph 0020 in Patent Document 1), a sufficiently large narrowed portion is provided so that the backflow phenomenon does not develop to the narrowed portion (FIG. 3B of Patent Document 1).

However, as a result of intensive studies by the present inventor, they have found that, even with the narrowed portion which is small enough to satisfy $0.01R1 \leq \sigma \leq 0.1R1$, it is possible to achieve a sufficient effect of improving the surge margin by providing a gradually inclined portion 24 downstream thereof so that intake air flows without separation, as described later in detail with reference to examples. Even in a case where a large narrowed portion is provided as in Patent Document 1, the effect of improving the surge margin decreases by separation of intake air downstream of the narrowed portion. That is, the present inventors have found that separation at the narrowed portion greatly affects the effect of improving the surge margin. An embodiment of the present invention has been completed based on such new finding of the present inventors.

In some embodiments, the centrifugal compressor 1 according to an embodiment of the present invention is configured to satisfy Ac≥At×Nw, where Ac is a flow passage area at the narrowed portion 22 (flow passage area of the narrowed passage 10A), At is a throat area of the inter-blade passage 16, and Nw is the number of the plurality of blades 6.

As described above, according to intensive studies by the present inventors, when σ>0.1R1, the constriction amount σ is too large so that choke position (position defining maximum flow rate) is shifted from the throat portion 16t of the impeller 2 to the narrowed portion 22, increasing effect on the reduction in choked flow rate. This means that, when σ=0.1R1, the flow passage area Ac corresponds to Ac=At×Nw.

In this regard, the centrifugal compressor 1 according to the above-described embodiment of the present invention is configured to satisfy Ac≥At×Nw. That is, the flow passage area Ac of the narrowed portion 22 is equal to or larger than the sum of the throat areas At of the inter-blade passages 16 (hereinafter, also simply referred to as throat are Ath of impeller section). Thus, it is possible to improve the surge margin by the narrowed portion 22 without reducing the choked flow rate.

In some embodiments, as shown in FIGS. 2, 3, 4, 5, 6A, and 6B, the downstream end 24b of the inclined portion 24 is at the same position as the tip 6b (leading edge tip 6ab) of the leading edge 6a of the blade 6 in the axial direction of the impeller 2, or the downstream end 24b of the inclined portion 24 is located within 0.5R1 upstream from the tip 6b (leading edge tip 6ab) of the leading edge 6a of the blade 6.

More specifically, the "vicinity" of the tip 6b of the blade 6 in the above embodiments includes at least a portion of the inner peripheral surface 20 within 0.5R1 upstream from the tip 6b (leading edge tip 6ab) of the leading edge 6a of the blade 6 in the axial direction of the impeller 2.

In the illustrated embodiments, the downstream end 24b of the inclined portion 24 is at the same position as the tip 6b (leading edge tip 6ab) of the leading edge 6a of the blade 6 in the axial direction of the impeller 2.

The effect of improving the surge margin is obtained by increasing the intake air velocity by the narrowed portion 22, and the narrowed portion 22 and the inclined portion 24 are preferably formed as close as possible to the tip 6b (leading edge tip 6ab) of the leading edge 6a of the blade 6. Thus, according to the above embodiments, it is possible to efficiently suppress the occurrence of backflow at the inlet of the impeller 2.

In some embodiments, as shown in FIGS. 2, 3, 4, 5, 6A, and 6B, a minor angle θ between the rotational axis RA of the impeller 2 and a straight line passing through the upstream end 24a and the downstream end 24b of the inclined portion 24 is 6° or less.

After passing through the narrowed portion 22, air accelerated by the narrowed portion 22 flows along the inclined portion 24. If the inclination angle θ of the inclined portion 24 is too large, separation may occur. According to findings of the present inventors, if the inclination angle θ of the inclined portion 24 is 6° or less, air having passed through the narrowed portion 22 flows along the inclined portion 24 without separation. Thus, according to the above embodiments, it is possible to efficiently suppress the occurrence of backflow at the inlet of the impeller 2.

In some embodiments, as shown in FIGS. 2, 3, 4, 5, 6A, and 6B, the narrowed portion 22 has a length L of 0.5R1 or more in the axial direction of the impeller 2.

If the length of the narrowed portion 22 in the axial direction is too short, the flow of air passing through the narrowed portion 22 does not follow the shape of the narrowed portion 22 and separation may occur. If separation occurs at the narrowed portion 22, the maximum flow rate which can pass through the narrowed portion 22 decreases, which may cause a reduction in choked flow rate. Further, the effect of suppressing the backflow downstream of the narrowed portion 22 may be weakened. Thus, according to the above embodiments, it is possible to efficiently improve the surge margin by the narrowed portion 22 without reducing the choked flow rate.

In some embodiments, as shown in FIGS. 2, 5, 6A, and 6B, the inclined portion 24 is linearly shaped in a cross-sectional view along the rotational axis RA of the impeller 2 (i.e., when viewed as shown in FIGS. 2, 5, 6A, and 6B).

According to the above embodiments, compared with a case where the inclined portion 24 is curved as in embodiments described later, it is possible to suppress the occurrence of backflow at the inlet of the impeller 2 with a simple structure.

Figure 3:
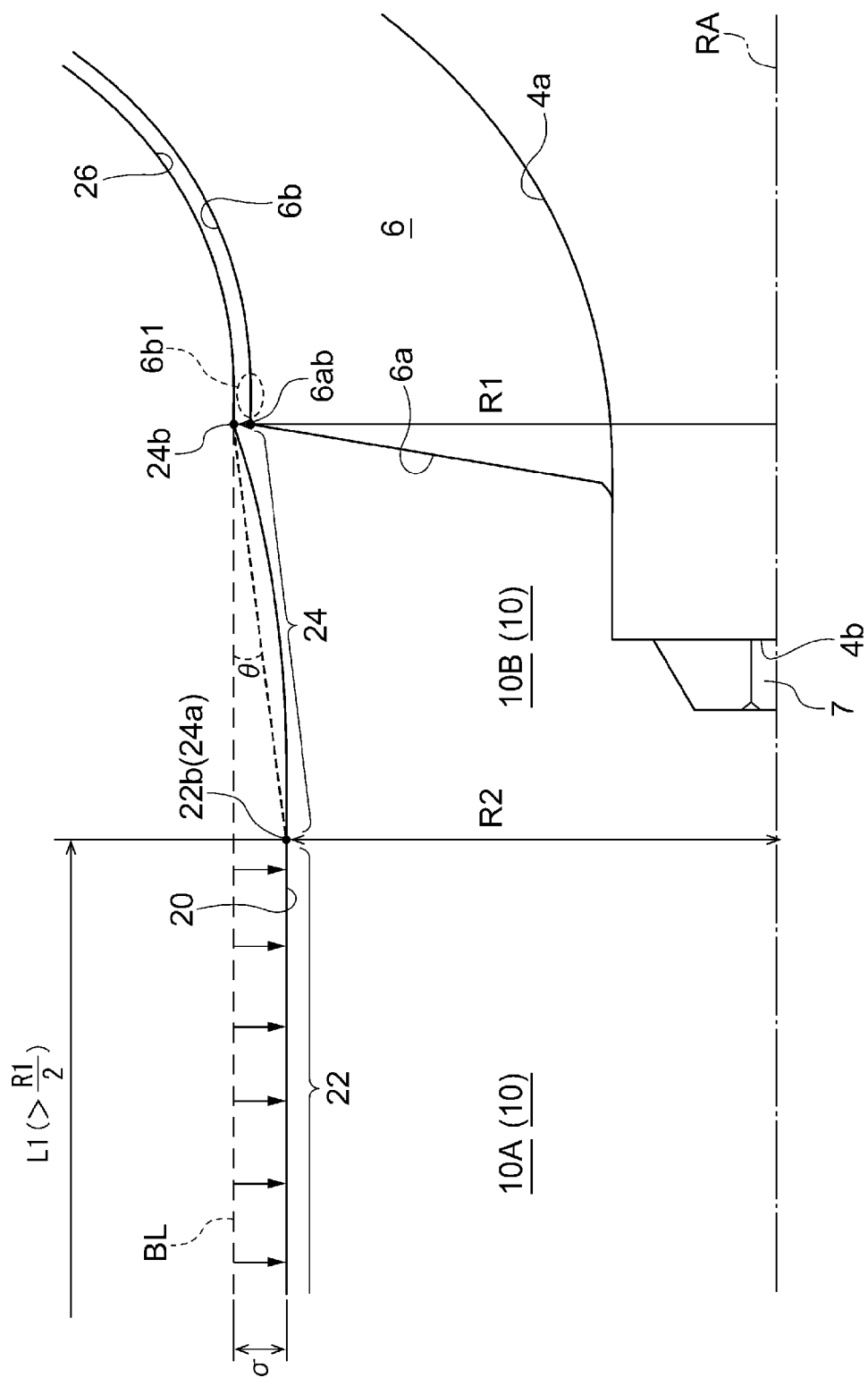
FIG. 3 is an enlarged view of a centrifugal compressor according to an embodiment of the present invention.
Figure 4:
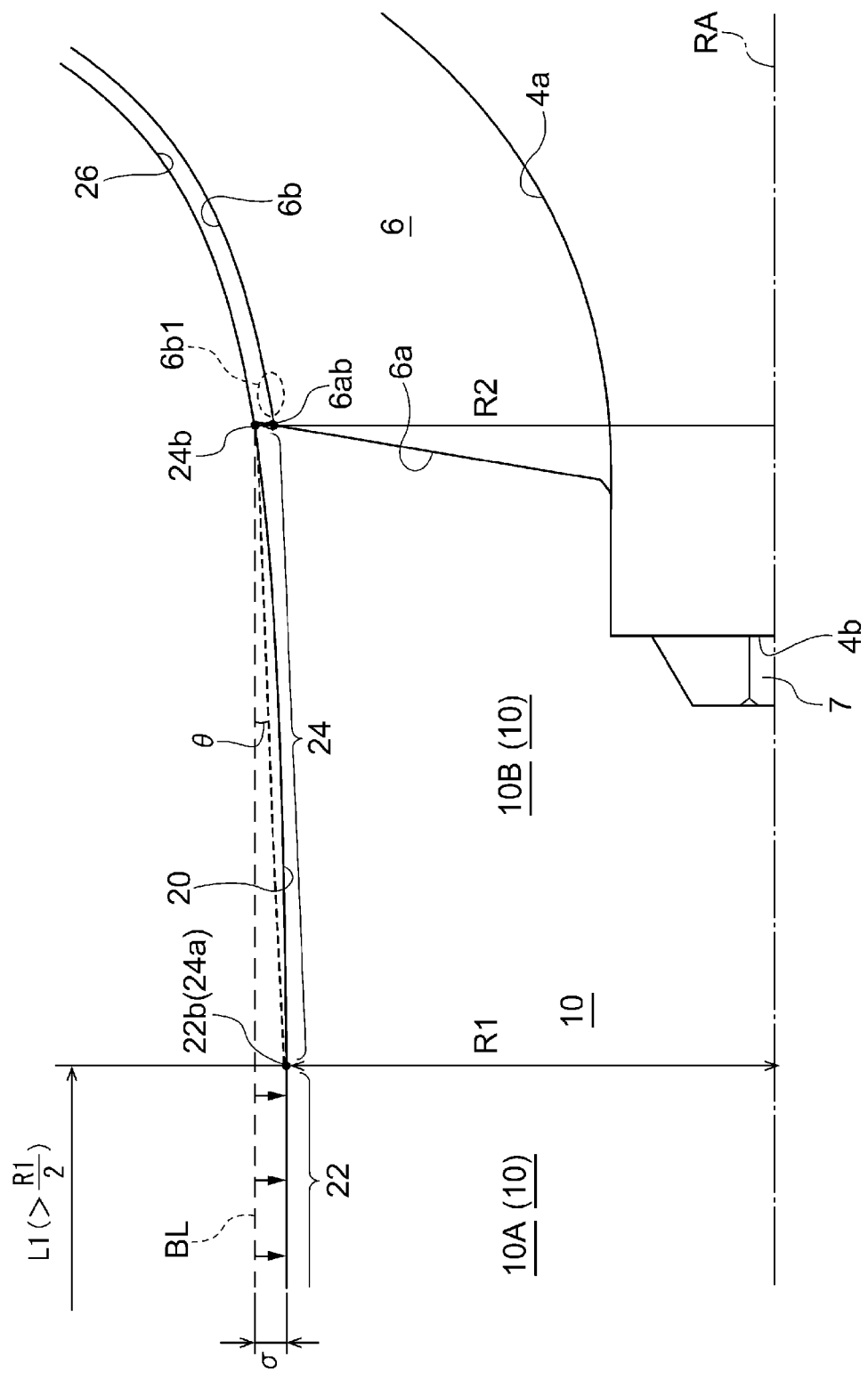
FIG. 4 is an enlarged view of a centrifugal compressor according to an embodiment of the present invention.

In some embodiments, as shown in FIGS. 3 and 4, the inclined portion 24 is curved convexly in a cross-sectional view along the rotational axis RA of the impeller 2 (i.e., when viewed as shown in FIGS. 3 and 4).

According to the above embodiments, compared with a case where the inclined portion 24 is shaped linearly as in the embodiments described above, it is possible to smoothly connect the narrowed portion 22 and the inclined portion 24. Thus, it is possible to suppress the separation of the flow of intake air at a joint between the narrowed portion 22 and the inclined portion 24. Thus, it is possible to efficiently improve the surge margin without reducing the choked flow rate at a joint between the narrowed portion 22 and the inclined portion 24.

In some embodiments, as shown in FIGS. 3 and 4, the inclined portion 24 protrudes inward in the radial direction with respect to a line (represented by the dotted line in FIGS. 3 and 4) connecting the upstream end 24a and the downstream end 24b of the inclined portion 24, from the upstream end 24a to the downstream end 24b of the inclined portion 24, in a cross-sectional view along the rotational axis RA of the impeller 2. That is, a portion recessed from the line is not formed between the upstream end 24a and the downstream end 24b of the inclined portion 24.

According to the above embodiments, since the inclined portion 24 has no portion recessed from the line connecting the upstream end 24a and the downstream end 24b, it is possible to suppress the separation of the flow of intake air along the inclined portion 24.

In some embodiments, as shown in FIG. 3, the inclined portion 24 is formed so as to have a constant curvature. With this configuration, compared with a case where the inclined portion 24 is smoothly curved as in embodiments described later, it is possible to suppress the occurrence of backflow at the inlet of the impeller 2 with a simple structure.

In some embodiments, as shown in FIG. 4, the inclined portion 24 and the shroud portion 26 are connected to form a smooth curve in a cross-sectional view along the rotational axis RA of the impeller 2.

In the illustrated embodiment, a smooth curve is formed so that the curvature gradually increases from the shroud portion 26 to the inclined portion 24. Thereby, a tip portion 6b1 including the tip 6b (leading edge tip 6ab) of the leading edge 6a of the blade 6 is not flat as in the embodiments shown in FIGS. 2, 3, 5, 6A, and 6B, but is formed obliquely such that the distance from the rotational axis RA of the impeller 2 in the radial direction gradually increases from a side of the leading edge 6a toward the trailing edge 6c.

According to the above embodiments, since the inclined portion 24 and the shroud portion 26 are smoothly connected, it is possible to reduce the loss caused by separation of the flow of intake air at a joint between the inclined portion 24 and the shroud portion 26.

Figure 5:
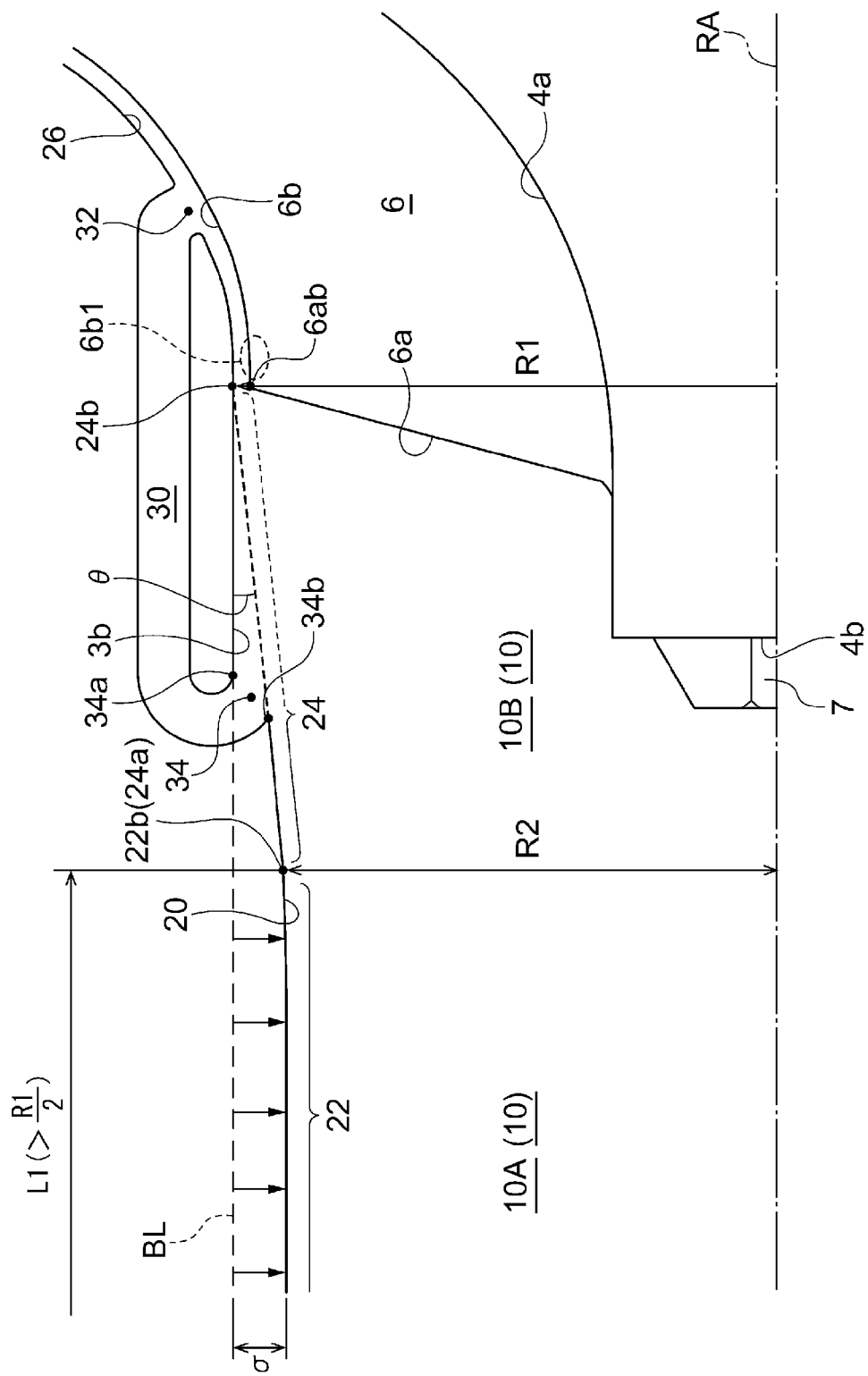
FIG. 5 is an enlarged view of a centrifugal compressor according to an embodiment of the present invention.

In some embodiments, as shown in FIG. 5, the casing 3 has a recirculation passage 30 connecting an inlet opening 32 formed in the shroud portion 26 and an outlet opening 34 formed upstream of the downstream end 24b of the inclined portion 24 on the inner peripheral surface of the inlet passage 10.

In the illustrated embodiment, a downstream edge 34b of the outlet opening 34 is positioned closer to the rotational axis RA than an upstream edge 34a of the outlet opening 34 is to the rotational axis RA in the radial direction. Further, in the illustrated embodiment, a distance between the upstream edge 34a of the outlet opening 34 and the rotational axis RA of the impeller 2 is equal to R1 described above. That is, among the inner peripheral surface 20 of the inlet passage 10, a recirculation passage outer surface 36 on which the upstream edge 34a of the outlet opening 34 and the downstream end 24b of the inclined portion 24 exist extends parallel to the rotational axis RA. Moreover, the recirculation passage 30 extends parallel to the rotational axis RA. Further, a plurality of the recirculation passage 30 is formed in the casing 3 at intervals in the circumferential direction.

It is known that the recirculation passage 30 for returning a part of intake air in the impeller 2 to the upstream side of the impeller 2 has effect of improving the surge margin. By directing the air flowing out of the outlet opening 34 of the recirculation passage 30 to the tip 6b of the blade 6 where backflow occurs, as parallel as possible to a flow direction of air flowing through the inlet passage 10 (i.e., a direction along the rotational axis RA), it is possible to improve the surge margin more efficiently. However, a conventional centrifugal compressor, in which the inner peripheral surface of the casing 3 (inner peripheral surface of the inner peripheral surface 10) is formed horizontally, is difficult to have such a flow passage shape. In a conventional centrifugal compressor, the air flowing out of the outlet opening 34 must flow in a direction largely intersecting with the flow of air flowing through the inlet passage 10, which causes loss. The above embodiment allows the air flowing out of the outlet opening 34 to flow in a direction close to parallel to the flow of air flowing through the inlet passage 10, which makes it possible to improve the surge margin effectively, while suppressing the occurrence of loss.

Figure 6A:
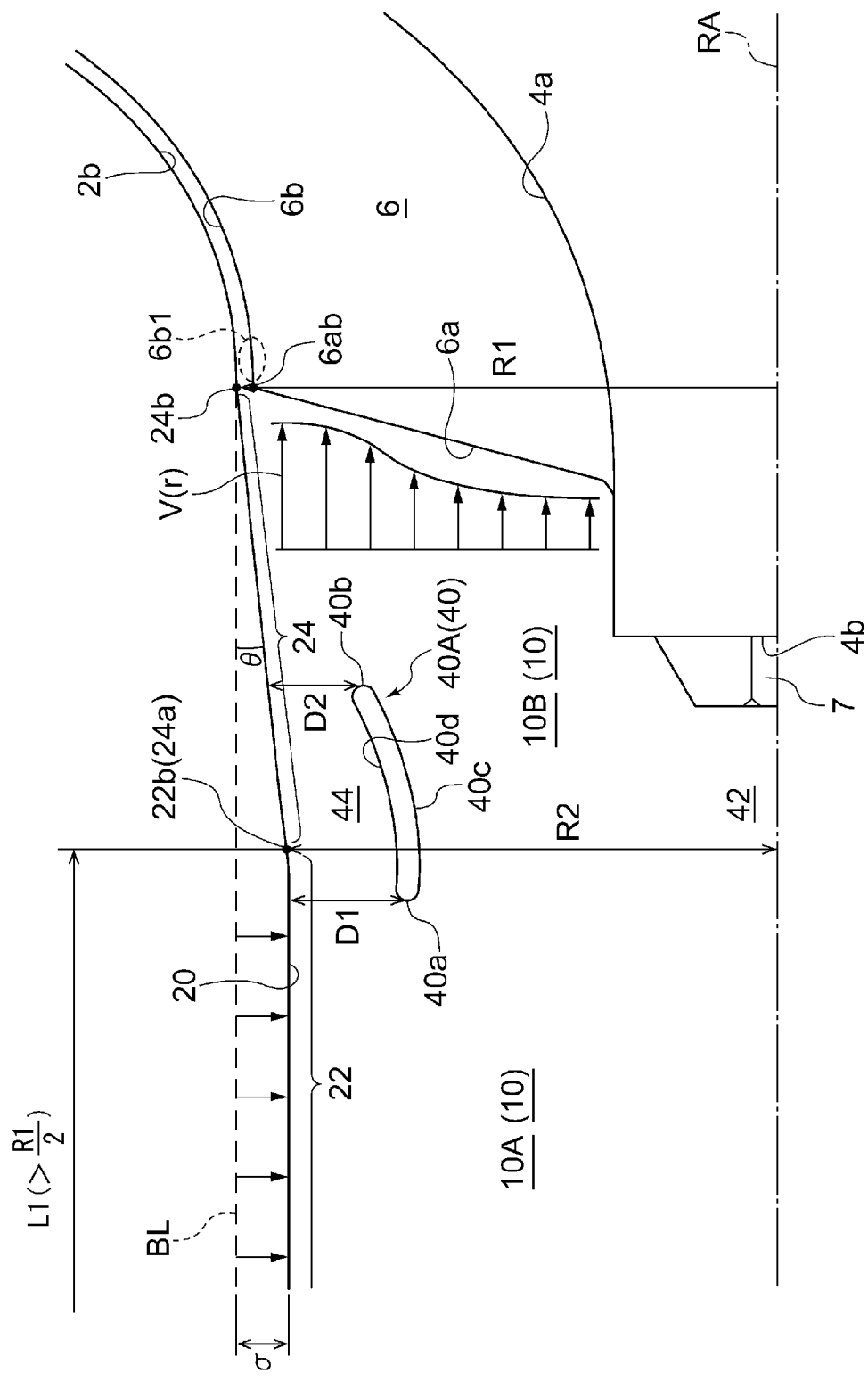
FIG. 6A is an enlarged view of a centrifugal compressor according to an embodiment of the present invention.
Figure 6B:
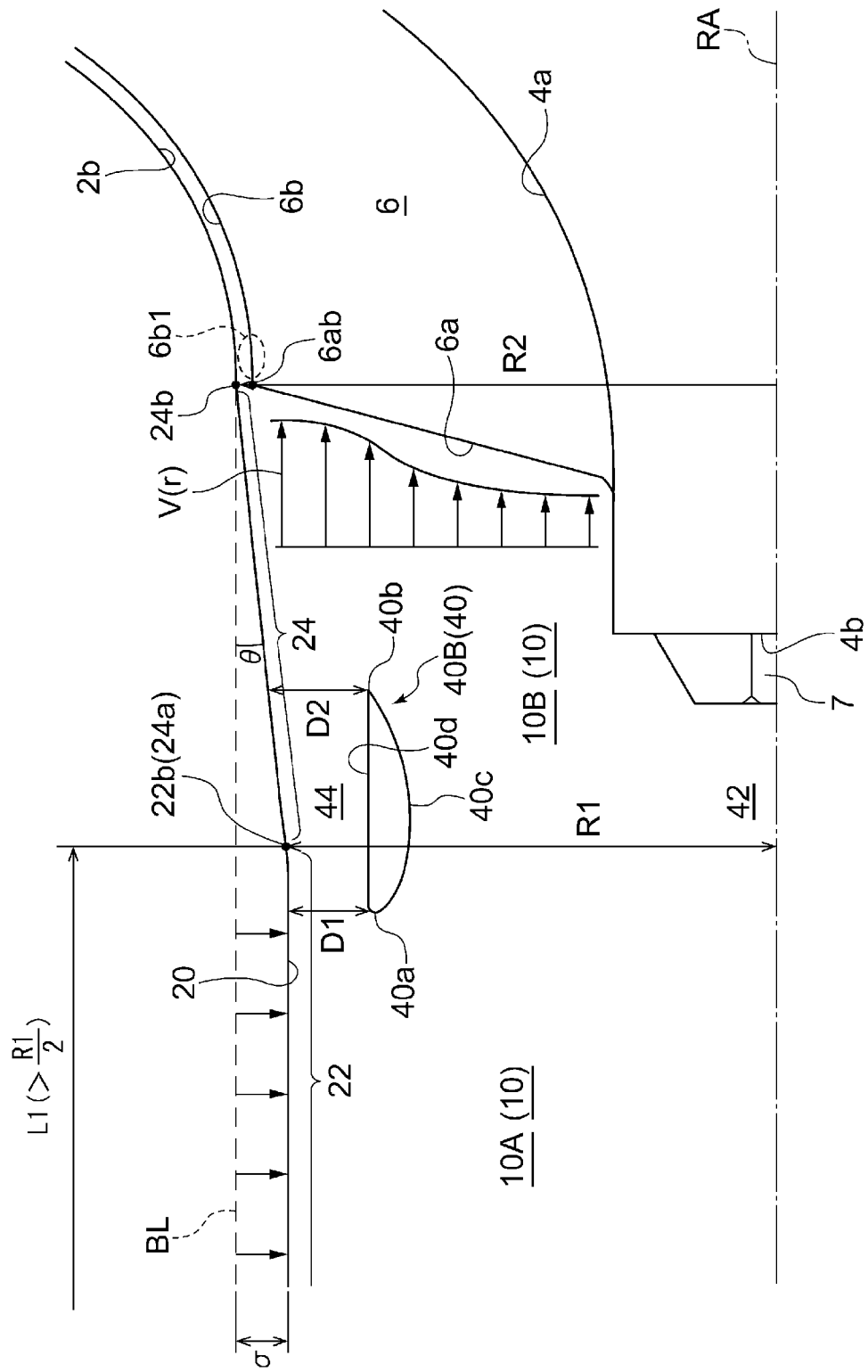
FIG. 6B is an enlarged view of a centrifugal compressor according to an embodiment of the present invention.

In some embodiments, as shown in FIGS. 6A and 6B, an annular guide vane 40A, 40B (40) is disposed upstream of the leading edge 6a of the blade 6 in the inlet passage 10. Further, when D1 is a distance between an upstream end 40a of the guide vane 40A, 40B and the inner peripheral surface 20 of the inlet passage 10 in the radial direction, and D2 is a distance between a downstream end 40b of the guide vane 40A, 40B and the inner peripheral surface 20 of the inlet passage 10 in the radial direction, D1>D2 is satisfied.

In the illustrated embodiments, the guide vane 40A, 40B is an annular (tubular) member extending in the circumferential direction around the rotational axis RA. That is, the center line of the annular guide vane 40A, 40B coincides with the rotational axis RA. Further, the annular guide vane 40A, 40B forms an inner flow passage 42 surrounded by an inner peripheral surface 40c and an outer flow passage 44 defined between an outer peripheral surface 40d and the inner peripheral surface 20 of the inlet passage 10.

Further, in the embodiment shown in FIG. 6A, the distance between the upstream end 40a of the guide vane 40A and the rotational axis RA in the radial direction is smaller than the distance between the downstream end 40b of the guide vane 40A and the rotational axis RA in the radial direction. By contrast, in the embodiment shown in FIG. 6B, the distance between the upstream end 40a of the guide vane 40A and the rotational axis RA in the radial direction is substantially equal to the distance between the downstream end 40b of the guide vane 40A and the rotational axis RA in the radial direction. That is, in the embodiment shown in FIG. 6B, the downstream end 40b of the guide vane 40A is positioned so as to overlap the inclined portion 24 in the axial direction of the impeller 2, whereby D1>D2 is satisfied.

According to the above embodiment, the air flowing through the outer flow passage 44 is directed to the tip 6b of the blade 6 where backflow occurs, and thereby the air flowing adjacent to the tip 6b of the blade 6 is accelerated, as shown in the depicted flow velocity distribution V(r). This suppresses backflow at the tip 6b of the blade 6. Thereby, it is possible to more efficiently improve the surge margin.

In some embodiments, as shown in FIG. 6B, the inner peripheral surface 40c of the guide vane 40B is curved convexly from the upstream end 40a to the downstream end 40b of the guide vane 40B in a cross-sectional view along the rotational axis RA of the impeller 2 (i.e., when viewed as shown in FIG. 6B). That is, the cross-sectional shape of the guide vane 40B is formed in so-called blade shape.

Further, in the embodiment shown in FIG. 6B, the outer peripheral surface 40d of the guide vane 40B extends substantially parallel to the rotational axis RA in a cross-sectional view along the rotational axis RA of the impeller 2.

According to the above embodiment, among the air flowing through the inner flow passage 42, the air flowing along the inner peripheral surface 40c of the guide vane 40B is directed to the tip 6b of the blade 6 where backflow occurs, and thereby the air flowing adjacent to the tip 6b of the blade 6 is accelerated, as shown in the depicted flow velocity distribution V(r). Thereby, it is possible to further suppress backflow at the tip 6b of the blade 6 in combination with the effect according to the embodiment described above. Thereby, it is possible to more efficiently improve the surge margin.

In some embodiments, as shown in FIG. 7, the casing 3 includes a scroll-side casing section 3A defining a diffuser passage 12 and a scroll passage 14 therein, and an inlet-side casing section 3B formed separately from the scroll-side casing section 3A and defining the inlet passage 10 therein. Further, the scroll-side casing section 3A and the inlet-side casing section 3B are connected along the axial direction of the impeller 2.

In the illustrated embodiment, the scroll-side casing section 3A has a scroll body portion 51 in which the diffuser passage 12 and the scroll passage 14 are defined, and an axial portion 52 extending from an inner peripheral portion of the scroll body portion 51 to the upstream side. Further, the inlet-side casing section 3B has an upstream portion 61 positioned upstream of the axial portion 52 of the scroll-side casing section 3A, and a downstream portion 62 positioned downstream of the upstream portion 61 on the radially inner side of the axial portion 52 of the scroll-side casing section 3A. Further, in a state where the scroll-side casing section 3A and the inlet-side casing section 3B are connected along the axial direction of the impeller 2, an inner peripheral surface 52a of the axial portion 52 of the scroll-side casing section 3A is in contact with an outer peripheral surface 62a of the downstream portion 62 of the inlet-side casing section 3B.

Further, in the illustrated embodiment, the inlet-side casing section 3B has a downstream end surface 64 which comes into contact with a stepped surface 54 formed in the scroll body portion 51 of the scroll-side casing section 3A. With this configuration, when the scroll-side casing section 3A is connected to the inlet-side casing section 3B, by bringing the downstream end surface 64 of the inlet-side casing section 3B into contact with the stepped surface 54 of the scroll-side casing section 3A, it is possible to easily determine positions of both sections.

Further, in the illustrated embodiment, a scroll-side flange portion 53 is formed at an end portion of the axial portion 52 of the scroll-side casing section 3A. On the other hand, an inlet-side flange portion 63 is formed at a downstream end portion of the upstream portion 61 of the inlet-side casing section 3B. By fastening the scroll-side flange portion 53 and the inlet-side flange portion 63 with a bolt or the like, the scroll-side casing section 3A and the inlet-side casing section 3B are coupled with each other. Further, in some embodiments, although not depicted, the scroll-side casing section 3A and the inlet-side casing section 3B may be connected by welding.

According to the above embodiment, it is possible to form the casing 3 by connecting the scroll-side casing section 3A with the inlet-side casing section 3B which is separate from the scroll-side casing section 3A. Therefore, it is possible to provide the centrifugal compressor 1 including the casing 3 with high versatility, for instance, by preparing a variety of inlet-side casing sections 3B having different shapes of the narrowed portions 22 and the inclined portions 24 and exchanging the inlet-side casing section 3B in accordance with the change of specification or the like.

In some embodiments, as shown in FIG. 7, the inner peripheral surface 62b of the inlet-side casing section 3B includes a portion from the upstream end 22a of the narrowed portion 22 to the downstream end 24b of the inclined portion 24.

In the illustrated embodiment, the inner peripheral surface 62b of the inlet-side casing section 3B includes the inclined portion 24, the narrowed portion 22, and a constriction portion 28.

According to the above embodiment, since the narrowed portion 22 and the inclined portion 24 are formed only on the inner peripheral surface 62b of the scroll-side casing section 3A, it is possible to provide the centrifugal compressor 1 including the casing 3 with high versatility.

Figure 9:
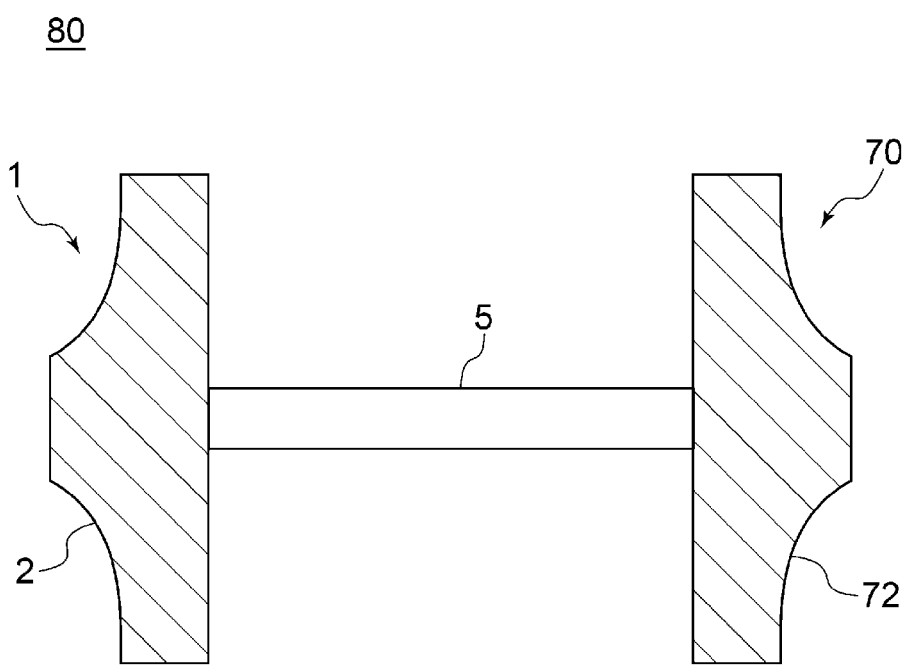
FIG. 9 is a schematic view of a turbocharger according to an embodiment of the present invention.

FIG. 9 is a schematic view of a turbocharger according to an embodiment of the present invention.

A turbocharger 80 according to an embodiment of the present invention includes the centrifugal compressor 1 according to an embodiment of the present invention, as shown in FIG. 9.

As shown in FIG. 9, the turbocharger 80 is formed by connecting the impeller 2 of the centrifugal compressor 1 to a turbine impeller 72 of a turbine 70 with a rotational shaft 5. Further, the turbocharger 80 may include, beside the components as illustrated, a casing 3 accommodating the impeller 2, a turbine housing accommodating the turbine impeller 72, a bearing rotatably supporting the rotational shaft 5, and a bearing housing accommodating the bearing.

According to the above embodiment, it is possible to provide a turbocharger 80 which enables both improvement of the surge margin and ensuring of the choked flow rate, with a simple structure.

Further, in some embodiments, the turbocharger 80 is a turbocharger 80 for use in an automobile engine.

In an automobile engine, extremely low speed operation and high speed operation are repeated. Accordingly, a wide-range and high-efficiency turbocharger enabling operation in a low-flow-rate operating region close to the surge line is desired for the automobile engine. The turbocharger 80 as described above is particularly suitable for such an automobile engine.

The embodiments of the present invention have been described above. However, the present invention is not limited thereto, and various modifications may be applied as long as they do not depart from the object of the present invention.

Figure 10A:
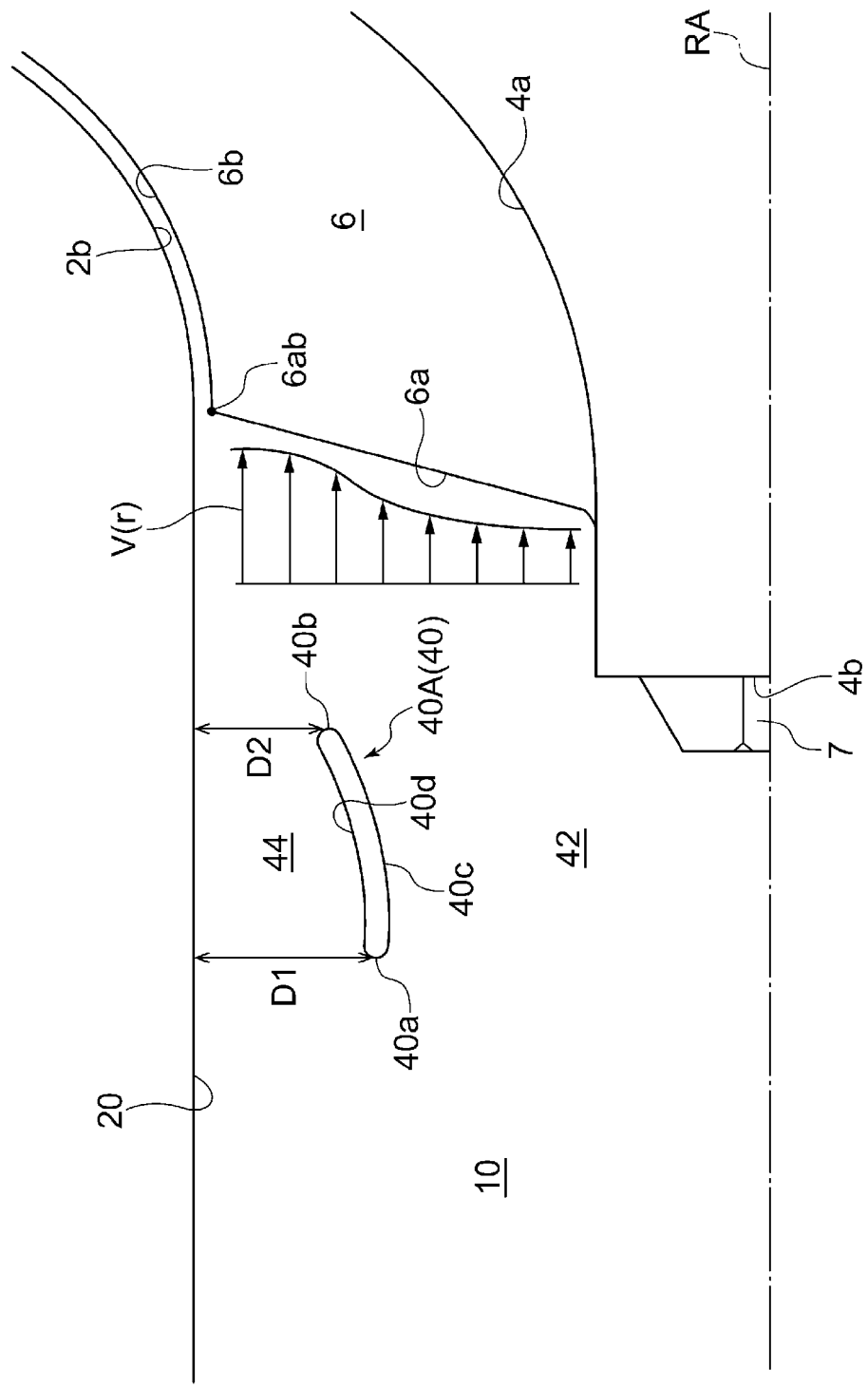
FIG. 10A is a diagram for describing a guide vane according to a reference embodiment of the present invention.
Figure 10B:
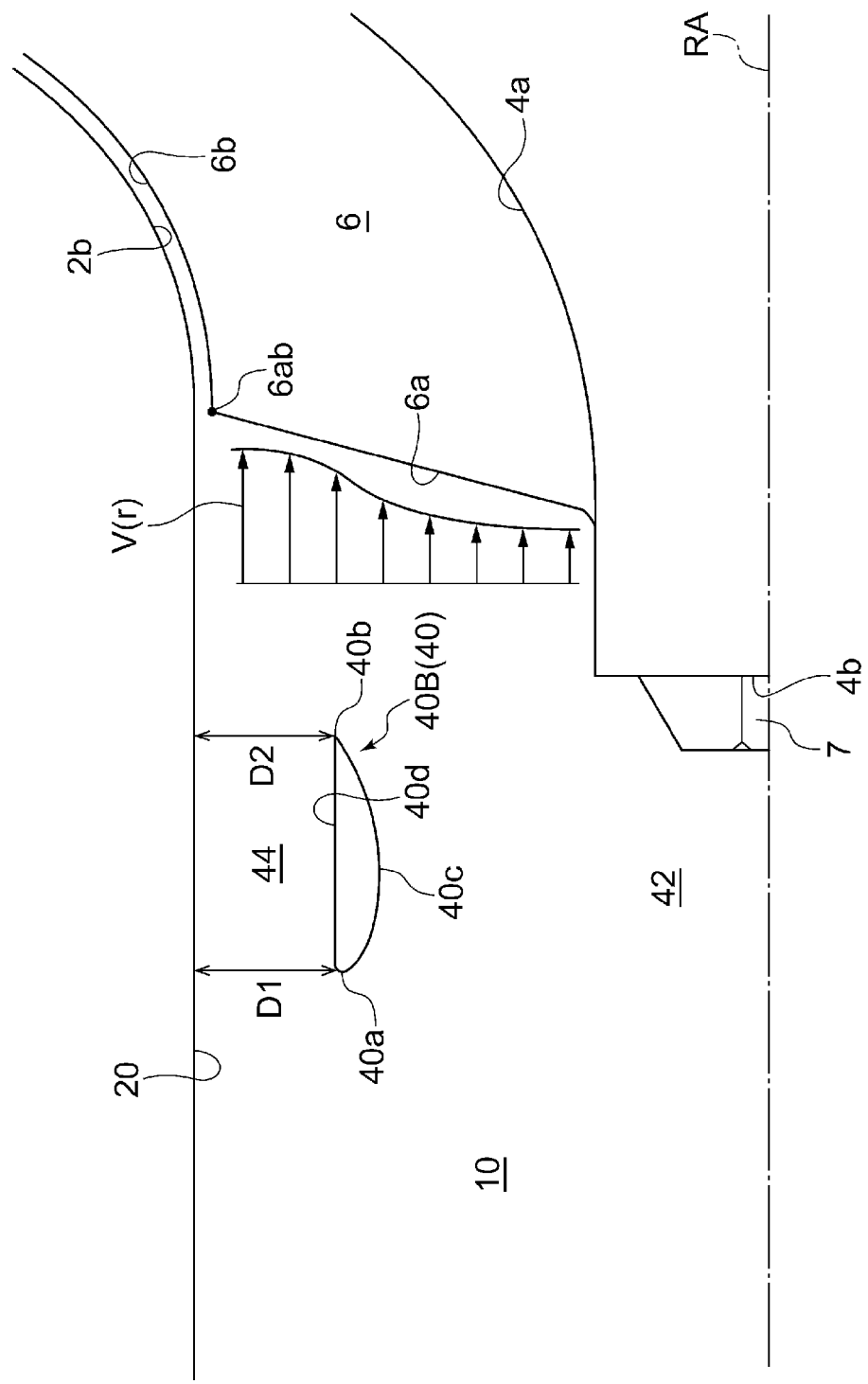
FIG. 10B is a diagram for describing a guide vane according to a reference embodiment of the present invention.

FIGS. 10A and 10B are a diagram for describing a guide vane according to a reference embodiment of the present invention.

A centrifugal compressor 1 including a guide vane 40A, 40B (40) according to a reference embodiment basically has the same configuration as in the embodiments shown in FIGS. 6A and 6B described above. Thus, the same component is associated with the same reference numeral and not described in detail.

The centrifugal compressor 1 including the guide vane 40A, 40B according a reference embodiment is different from the above-described embodiments in that the narrowed portion 22 and the inclined portion 24 are not formed on the inner peripheral surface 20 of the inlet passage 10. More specifically, in the centrifugal compressor 1 according to a reference embodiment, as shown in FIGS. 10A and 10B, the inner peripheral surface 20 of the inlet passage 10 is formed in parallel to the rotational axis RA on the upstream side of the shroud portion 26, in a cross-sectional view along the rotational axis RA of the impeller 2 (i.e., when viewed as shown in FIGS. 10A and 10B).

Further, in the centrifugal compressor 1 according to a reference embodiment, as shown in FIG. 10A, an annular guide vane 40A is disposed upstream of the leading edge 6a of the blade 6 in the inlet passage 10. Further, when D1 is a distance between an upstream end 40a of the guide vane 40A and the inner peripheral surface 20 of the inlet passage 10 in the radial direction, and D2 is a distance between a downstream end 40b of the guide vane 40A and the inner peripheral surface 20 of the inlet passage 10 in the radial direction, D1>D2 is satisfied.

According to this reference embodiment, the air flowing through the outer flow passage 44 is directed to the tip 6b of the blade 6 where backflow occurs, and thereby the air flowing adjacent to the tip 6b of the blade 6 is accelerated, as shown in the depicted flow velocity distribution V(r). This suppresses backflow at the tip 6b of the blade 6. Thereby, it is possible to improve the surge margin.

Alternatively, in the centrifugal compressor 1 according to a reference embodiment, as shown in FIG. 10B, an annular guide vane 40B is disposed upstream of the leading edge 6a of the blade 6 in the inlet passage 10. Further, an inner peripheral surface 40c of the guide vane 40B is curved convexly from the upstream end 40a to the downstream end 40b of the guide vane 40B in a cross-sectional view along the rotational axis RA of the impeller 2. Further, when D1 is a distance between the upstream end 40a of the guide vane 40B and the inner peripheral surface 20 of the inlet passage 10 in the radial direction, and D2 is a distance between the downstream end 40b of the guide vane 40B and the inner peripheral surface 20 of the inlet passage 10 in the radial direction, D1=D2 is satisfied.

According to this reference embodiment, among the air flowing through the inner flow passage 42, the air flowing along the inner peripheral surface 40c of the guide vane 40B is directed to the tip 6b of the blade 6 where backflow occurs, and thereby the air flowing adjacent to the tip 6b of the blade 6 is accelerated, as shown in the depicted flow velocity distribution V(r). Thus, although D1<D2 is not satisfied unlike the embodiment shown in FIG. 10A, backflow at the tip 6b of the blade 6 is suppressed, and thereby it is possible to improve the surge margin.

Further, in some reference embodiments, in the reference embodiment shown in FIG. 10B, the guide vane 40B may be configured to satisfy D1<D2. According to this reference embodiment, the air flowing through the outer flow passage 44 is directed to the tip 6b of the blade 6 where backflow occurs, and simultaneously, among the air flowing through the inner flow passage 42, the air flowing along the inner peripheral surface 40c of the guide vane 40B is directed to the tip 6b of the blade 6 where backflow occurs. Thereby, the air flowing adjacent to the tip 6b of the blade 6 is further accelerated. This suppresses backflow at the tip 6b of the blade 6, and thereby it is possible to improve the surge margin more effectively.

In some embodiments, the centrifugal compressor is configured to satisfy $Ac \geq 1.03 At \times Nw$, where Ac is a flow passage area at the narrowed portion 22, At is a throat area of the inter-blade passage 16, and Nw is the number of the plurality of blades 6.

The reasons will now be described, with reference to FIGS. 11A and 11B.

Figure 11B:
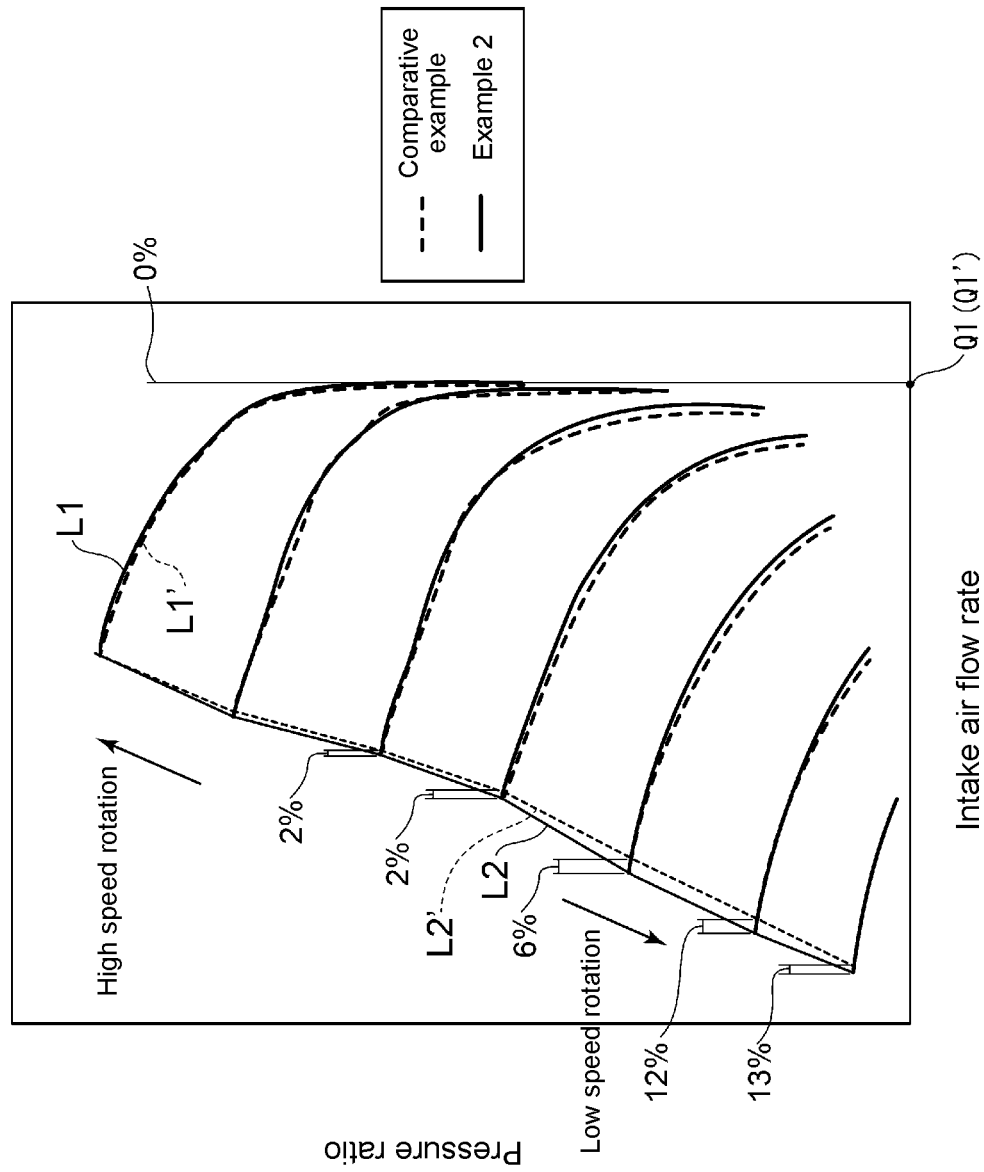
FIG. 11B is a graph for describing an effect of a centrifugal compressor according to an embodiment of the present invention.

FIGS. 11A and 11B are graphs for describing an effect of the centrifugal compressor according to an embodiment of the present invention.

The graphs of FIGS. 11A and 11B are compressor maps showing characteristics of the centrifugal compressor 1 according to an embodiment of the present invention. In the graphs of FIGS. 11A and 11B, the horizontal axis represents intake air flow rate, and the vertical axis represents pressure ratio. Line L1 (L1') in the graph represents a relationship between intake air flow rate and pressure ratio at a predetermined rotational speed. Line L2 (L2') in the graph is a surge line and shows that surging is likely to occur when the operational point is in a region S on the left side of the surge line L2. Further, intake air flow rate Q1 (Q1') in the graph represents maximum flow rate (choked flow rate) which can pass through the impeller section.

In the graph of FIG. 11A, the solid line shows a case of example 1, and the dotted line shows a case of comparative example. In the graph of FIG. 11B, the solid line shows a case of example 2, and the dotted line shows a case of comparative example (same as the comparative example shown in FIG. 11A).

Tests (actual machine test) for examples 1 and 2 are performed on the centrifugal compressor 1 shown in FIG. 3 described above. Example 1 is a case where the flow passage area Ac at the narrowed portion 22 is equal to the throat area Ath (=At×Nw) of the impeller section (Ac=Ath). In this example, the constriction amount σ is 0.08R1. Example 2 is a case where the flow passage area Ac at the narrowed portion 22 and the throat area Ath of the impeller section have a relationship of Ac=1.03Ath, and the constriction amount σ is less than 0.08R1 (and 0.01R1 or more).

Tests (actual machine test) for comparative example are performed on a centrifugal compressor not including the narrowed portion 22 and the inclined portion 24, in contract to the centrifugal compressor 1 shown in FIG. 3. More specifically, the tests are performed on a centrifugal compressor 1 in which the inner peripheral surface 20 of the inlet passage 10 coincides with the reference line BL (Ac≥1.2Ath approximately, constriction amount σ=0). Other test conditions are same as in examples 1 and 2.

As shown in FIG. 11A, in comparison of example 1 with comparative example, example 1, the surge margin improvement effect is achieved in each rotational speed region from a high rotational speed region to a low rotational speed region, and particularly in a low rotational speed region, example 1 exhibits a surge margin improvement effect 9% to 16% higher than comparative example.

However, as shown in FIG. 11A, the choked flow rate Q1 in example 1 is 3% smaller than the choked flow rate Q1' in comparative example. This means that even if the flow passage area Ac at the narrowed portion 22 is equal to the throat area Ath (=At×Nw) of the impeller section (Ac=Ath), the choked flow rate Q1 is defined by the throat area of the impeller section. The reason is considered that, in the air flowing downstream of the narrowed portion 22, a boundary layer develops at the interface with the inner peripheral surface, which decreases the effective flow passage area at the inlet of the impeller section.

A possible solution to compensate the decrease in surge flow rate is to increase the outer diameter of the impeller 2 and increase the throat area Ath of the impeller section. However, if the outer diameter of the impeller 2 is increased, the circumferential velocity increases and the absolute velocity decreases at the inlet of the impeller. As a result, surging is likely to occur. Further, increasing the outer diameter of the impeller 2 increases the cost.

In view of this, the present inventors have considered increasing the flow passage area Ac at the narrowed portion 22 to be slightly larger than the throat area Ath of the impeller section to compensate the decrease in surge flow rate, instead of increasing the outer diameter of the impeller 2.

More specifically, as a result of intensive studies, they have arrived at a relationship of Ac≥1.03Ath (=At×Nw).

As shown in FIG. 11B, in comparison of example 2 with comparative example, similarly, the surge margin improvement effect is achieved in each rotational speed region from a high rotational speed region to a low rotational speed region, and particularly in a low rotational speed region, example 2 exhibits a surge margin improvement effect 6% to 13% higher than comparative example.

Further, as shown in FIG. 11B, in a case where the flow passage area Ac at the narrowed portion 22 and the throat area Ath (=At×Nw) of the impeller section have a relationship of Ac=1.03Ath, the choked flow rate Q1 in example 2 is substantially equal to the choked flow rate Q1' in comparative example. The reason is considered that, since the intake air flow rate passing through the narrowed portion increases as the constriction amount σ decreases, the average flow velocity of the air passing through the throat portion of the impeller section increases.

As described above, in some embodiments, even in a case where the narrowed portion 22 is provided on the inner peripheral surface 20 of the inlet passage 10, by setting the flow passage area Ac at the narrowed portion 22 so as to satisfy Ac≥1.03Ath (=At×Nw), it is possible to sufficiently improve the surge margin, and it is possible to compensate the decrease in choked flow rate Qth defined by the throat area Ath of the impeller section.

The flow passage area Ac at the narrowed portion 22 is not limited to a particular value, as long as the effect of the present invention can be achieved. In an embodiment, 1.20Ath≥Ac≥1.03ATh, and in another embodiment, 1.10Ath≥Ac≥1.03Ath.

The preferred embodiments of the present invention have been described above, but the present invention is not limited thereto. Various modifications may be applied as long as they do not depart from the object of the present invention.

For instance, a centrifugal compressor according to an embodiment of the present invention may include an impeller including a hub and a plurality of blades disposed on an outer peripheral surface of the hub at intervals in a circumferential direction; and a casing accommodating the impeller and defining an inlet passage for introducing air to the impeller along an axial direction of the impeller therein, and an inner peripheral surface of the inlet passage may include a narrowed portion and an inclined portion connected to a downstream side of the narrowed portion, with a distance between the inclined portion and a rotational axis of the impeller in a radial direction gradually increasing toward the vicinity of tips of leading edges of the blades, and Ac≥At×Nw is satisfied, where Ac is a flow passage area at the narrowed portion, At is a throat area of an inter-blade passage defined by a pair of adjacent blades of the plurality of blades, and Nw is the number of the plurality of blades.

REFERENCE SIGNS LIST

1 Centrifugal compressor
2 Impeller
3 Casing
3A Scroll-side casing section
3B Inlet-side casing section
4 Hub
4a Outer peripheral surface
5 Rotational shaft
6, 6A, 6B Blade
6a Leading edge
6b Tip
6b1 Tip portion
6c Trailing edge
6ab Leading edge tip
6sa Pressure surface
6sb Suction surface
7 Nut
10 Inlet passage
10A Narrowed passage
10B Enlarged passage
12 Diffuser passage
13 Inlet portion
14 Scroll passage
16 Inter-blade passage
16t Throat portion
20 Inner peripheral surface
22 Narrowed portion
24 Inclined portion
26 Shroud portion
28 Constriction portion
30 Recirculation passage
32 Inlet opening
34 Outlet opening
34a Upstream edge
34b Downstream edge
36 Recirculation passage outer surface
40, 40A, 40B Guide vane
42 Inner flow passage
44 Outer flow passage
51 Scroll body portion
52 Axial portion
53 Scroll-side flange portion
54 Stepped surface
61 Upstream portion
62 Downstream portion
63 Inlet-side flange portion
64 Downstream end surface
Ac Flow passage area
At Throat area
BL Reference line
Lt Throat length
RA Rotational axis
V(r) Flow velocity distribution
sa Air

The invention claimed is:

1. A centrifugal compressor comprising:
   an impeller including a hub and a plurality of blades disposed on an outer peripheral surface of the hub at intervals in a circumferential direction; and
   a casing accommodating the impeller and defining an inlet passage for introducing air to the impeller along an axial direction of the impeller therein,
   wherein an inner peripheral surface of the inlet passage includes a narrowed portion and an inclined portion connected to a downstream side of the narrowed portion and a shroud portion connected to a downstream end of the inclined portion and disposed with a clearance from tips of the blades, a distance between the inclined portion and a rotational axis of the impeller in a radial direction gradually increasing toward a vicinity of tips of leading edges of the blades,
   wherein $0.01R1 \leq \sigma \leq 0.1R1$ is satisfied, where R1 is a distance between the downstream end of the inclined portion and the rotational axis of the impeller in the radial direction, R2 is a distance between the downstream end of the narrowed portion and the rotational axis of the impeller in the radial direction, and σ is a constriction amount which is a difference between R1 and R2, and
   wherein a distance between the shroud portion at the same position as the tips of the leading edges of the blades in the axial direction of the impeller and the rotational axis of the impeller in the radial direction is equal to R1.

2. The centrifugal compressor according to claim 1, wherein Ac≥At×Nw is satisfied, where Ac is a flow passage area at the narrowed portion, At is a throat area of an inter-blade passage defined by a pair of adjacent blades of the plurality of blades, and Nw is the number of the plurality of blades.

3. The centrifugal compressor according to claim 2, wherein Ac≥1.03At×Nw is satisfied.

4. The centrifugal compressor according to claim 1, wherein, when R1 is the distance between the downstream end of the inclined portion and the rotational axis of the impeller in the radial direction, the downstream end of the inclined portion is at the same position as the tips of the leading edges of the blades in the axial direction of the impeller, or the downstream end of the inclined portion is located within 0.5R1 upstream from the tips of the leading edges of the blades.

5. The centrifugal compressor according to claim 1, wherein a minor angle between the rotational axis of the impeller and a straight line passing through an upstream end and the downstream end of the inclined portion is 6° or less.

6. The centrifugal compressor according to claim 1, wherein, when R1 is the distance between the downstream end of the inclined portion and the rotational axis of the impeller in the radial direction, the narrowed portion has a length of 0.5R1 or more in the axial direction of the impeller.

7. The centrifugal compressor according to claim 1, wherein the inclined portion is linearly shaped in a cross-sectional view along the rotational axis of the impeller.

8. The centrifugal compressor according to claim 1, wherein the inclined portion is curved convexly in a cross-sectional view along the rotational axis of the impeller.

9. The centrifugal compressor according to claim 8, wherein the inclined portion protrudes inward in the radial direction with respect to a line connecting an upstream end and the downstream end of the inclined portion, from the upstream end to the downstream end of the inclined portion, in a cross-sectional view along the rotational axis of the impeller.

10. The centrifugal compressor according to claim 8, wherein the inclined portion and the shroud portion are connected to form a smooth curve in a cross-sectional view along the rotational axis of the impeller.

11. The centrifugal compressor according to claim 1, wherein the casing has a recirculation passage connecting an inlet opening formed in the shroud portion and an outlet opening formed upstream of the downstream end of the inclined portion in the inner peripheral surface of the inlet passage.

12. The centrifugal compressor according to claim 1, wherein an annular guide vane is disposed in the inlet passage at a position upstream of the leading edges of the blades, and
wherein D1>D2 is satisfied, where D1 is a distance between an upstream end of the guide vane and the inner peripheral surface of the inlet passage in the radial direction, and D2 is a distance between a downstream end of the guide vane and the inner peripheral surface of the inlet passage in the radial direction.

13. The centrifugal compressor according to claim 12, wherein an inner peripheral surface of the guide vane is curved convexly from the upstream end to the downstream end of the guide vane in a cross-sectional view along the rotational axis of the impeller.

14. The centrifugal compressor according to claim 1, wherein the casing includes:
a scroll-side casing section defining therein a diffuser passage through which air compressed by the impeller flows, and a scroll passage which is formed on a radially outer side of the diffuser passage and into which the air having passed through the diffuser passage flows; and
an inlet-side casing section formed separately from the scroll-side casing section and defining therein the inlet passage, and
wherein the scroll-side casing section and the inlet-side casing section are connected along the axial direction of the impeller.

15. The centrifugal compressor according to claim 14, wherein an inner peripheral surface of the inlet-side casing section includes a portion from an upstream end of the narrowed portion to the downstream end of the inclined portion.

16. A turbocharger comprising the centrifugal compressor according to claim 1.

* * * * *